(12) United States Patent
Konishi et al.

(10) Patent No.: US 6,283,647 B1
(45) Date of Patent: Sep. 4, 2001

(54) BAR CODE PRINTER THAT AUTOMATICALLY SETS ONE BAR COLOR IN RESPONSE TO ANOTHER BAR COLOR

(75) Inventors: Yoshiharu Konishi; Hitoshi Hayama, both of Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/537,938

(22) Filed: Mar. 29, 2000

(30) Foreign Application Priority Data

Mar. 30, 1999 (JP) .................................................. 11-088250

(51) Int. Cl.⁷ ................................. B41J 2/00; B41J 5/00; B41J 5/30
(52) U.S. Cl. .............................. 400/103; 400/76; 400/70; 400/61; 400/106
(58) Field of Search .................................... 400/103, 106, 400/76, 70, 61

(56) References Cited

U.S. PATENT DOCUMENTS

| 3,810,423 | * | 5/1974 | Hansen et al. ......................... 101/93 |
| 5,496,117 | * | 3/1996 | Sawada et al. ......................... 400/61 |
| 5,564,841 | * | 10/1996 | Austin et al. ......................... 400/103 |
| 5,835,615 | * | 10/1998 | Lubow et al. ......................... 382/112 |
| 6,042,279 | * | 3/2000 | Ackley ................................. 400/103 |

FOREIGN PATENT DOCUMENTS

| 4-88585 | 3/1992 | (JP) . |
| 10-187905 | 7/1998 | (JP) . |
| 2-583622 | 8/1998 | (JP) . |

OTHER PUBLICATIONS

IBM Technical Disclosure Bulletin, vol. 33, Issue Number 6B, pp. 274–277, Nov. 1990.*
IBM Technical Disclosure Bulletin, vol. 26, Issue Number 1, pp. 135–144, Jun. 1983.*

* cited by examiner

Primary Examiner—John S. Hilten
Assistant Examiner—Charles H. Nolan, Jr.
(74) Attorney, Agent, or Firm—Hogan & Hartson, L.L.P.

(57) ABSTRACT

There is provided an image printing method and device which is capable of easily printing a bar code image having colors conforming to a bar code print quality standard. A bar code pattern defining the arrangement of bars of two kinds in a bar code is set. The bars of two kinds include at least one bar of a first kind and at least one bar of a second kind. The at least one bar of the first kind are different in optical reflectance from the at least one bar of the second kind. A first bar color is set which defines a printing color of the at least one bar of the first kind. A second bar color is set which defines a printing color of the at least one bar of the second kind, based on a predetermined bar code print quality standard which defines conditions concerning the optical reflectance of the bars of two kinds, such that a combination of the first bar color and the second bar color conforms to the predetermined bar code print quality standard. A bar code image which is a print image of the bar code, is printed on a printing object, based on the bar code pattern, the first bar color, and the second bar color.

30 Claims, 46 Drawing Sheets

| No. | TAPE TYPE (MATE-RIAL) | WHITE BAR COLOR | BLACK BAR COLOR | REFLECT-ANCE DIFFER-ENCE (PCS VALUE) | CON-FORMITY(O)/ NON-CONFORMITY (X) | CORRE-SPOND-ING No. |
|---|---|---|---|---|---|---|
| 3-1 | A | COLOR a : 90 | COLOR a : 90 | 0 | X | 1-1 |
| 3-2 | | | COLOR b : 25 | 0.72 | X | 1-2 |
| 3-3 | | | COLOR c : 5 | 0.94 | O | 1-3 |
| 3-4 | | | GROUND COLOR : 40 | 0.56 | X | 1-4 |
| 3-5 | | COLOR b : 25 | COLOR a : 90 | 0.72 | X | 1-2 |
| 3-6 | | | COLOR b : 25 | 0 | X | 1-6 |
| 3-7 | | | COLOR c : 5 | 0.80 | O | 1-7 |
| 3-8 | | | GROUND COLOR : 40 | 0.30 | X | 1-14 |
| 3-9 | | COLOR c : 5 | COLOR a : 90 | 0.94 | O | 1-3 |
| 3-10 | | | COLOR b : 25 | 0.80 | O | 1-7 |
| 3-11 | | | COLOR c : 5 | 0 | X | 1-11 |
| 3-12 | | | GROUND COLOR : 40 | 0.88 | O | 1-15 |
| 3-13 | | GROUND COLOR : 40 | COLOR a : 90 | 0.56 | X | 1-4 |
| 3-14 | | | COLOR b : 25 | 0.38 | X | 1-14 |
| 3-15 | | | COLOR c : 5 | 0.88 | O | 1-15 |
| 3-16 | | | GROUND COLOR : 40 | 0 | X | 1-16 |

FIG. 12

| No. | STANDARD VALUE | EXAMPLE OF CONDITIONS |
|---|---|---|
| 1 | <PCS VALUE><br><br>$PCS = \dfrac{Ry - Rx}{Ry}$<br><br>Ry: WHITE BAR REFLECTANCE [%]<br>RX: BLACK BAR REFLECTANCE [%] | <ANSI, JIS><br><br>PCS ≧ 0.75<br><br>Rymin ≧ 50% (x < 0.51mm)<br>Rymin ≧ 25% (x ≧ 0.51mm)<br><br>Rymin: WHITE BAR MINIMUM REFLECTANCE<br>X: WHITE BAR MINIMUM WIDTH |
| 2 | <REFLECTANCE RATIO><br><br>Ry/Rx | <ANSI><br><br>≧ 4 |
| 3 | <MRD VALUE><br><br>MRD = Rymin − Rxmax<br><br>Rymin: WHITE BAR MINIMUM REFLECTANCE [%]<br>RXmax: BLACK BAR MAXIMUM REFLECTANCE [%] | <AIM><br><br>MRD ≧ 37.5% (X ≦ 1.02mm)<br>MRD ≧ 20.0% (X ≧ 1.02mm)<br><br>Rymin ≧ 25%<br>Rxmax ≧ 30% |

F I G. 1 3

| No. | TAPE TYPE (MATE-RIAL) | WHITE BAR COLOR : REFERECTANCE Ry [%] | BLACK BAR COLOR : REFERECTANCE Rx [%] | STANDARD VALUE (PCS VALUE) | CONFORMITY(O)/ NON-CONFORMITY (X) |
|---|---|---|---|---|---|
| 1-1 | A | COLOR a : 90 | COLOR a : 90 | 0 | X |
| 1-2 | | | COLOR b : 25 | 0.72 | X |
| 1-3 | | | COLOR c : 5 | 0.94 | O |
| 1-4 | | | GROUND COLOR : 40 | 0.56 | X |
| 1-5 | | COLOR b : 25 | COLOR a : 90 | — | X |
| 1-6 | | | COLOR b : 25 | 0 | X |
| 1-7 | | | COLOR c : 5 | 0.80 | O |
| 1-8 | | | GROUND COLOR : 40 | — | X |
| 1-9 | | COLOR c : 5 | COLOR a : 90 | — | X |
| 1-10 | | | COLOR b : 25 | — | X |
| 1-11 | | | COLOR c : 5 | 0 | X |
| 1-12 | | | GROUND COLOR : 40 | — | X |
| 1-13 | | GROUND COLOR : 40 | COLOR a : 90 | — | X |
| 1-14 | | | COLOR b : 25 | 0.38 | X |
| 1-15 | | | COLOR c : 5 | 0.88 | O |
| 1-16 | | | GROUND COLOR : 40 | 0 | X |

F I G. 1 4

| No. | TAPE TYPE (MATE-RIAL) | WHITE BAR COLOR : REFERECTANCE Ry [%] | BLACK BAR COLOR : REFERECTANCE Rx [%] | STANDARD VALUE (PCS VALUE) | CONFORMITY(O)/ NON-CONFORMITY (X) |
|---|---|---|---|---|---|
| 1-17 | B | COLOR a : 80 | COLOR a : 80 | 0 | X |
| 1-18 | | | COLOR b : 20 | 0.75 | O |
| 1-19 | | | COLOR c : 3 | 0.96 | O O |
| 1-20 | | | GROUND COLOR : 80 | 0. | X |
| 1-21 | | COLOR b : 20 | COLOR a : 80 | — | X |
| 1-22 | | | COLOR b : 20 | 0 | X |
| 1-23 | | | COLOR c : 3 | 0.85 | O |
| 1-24 | | | GROUND COLOR : 80 | — | X |
| 1-25 | | COLOR c : 3 | COLOR a : 80 | — | X |
| 1-26 | | | COLOR b : 17 | — | X |
| 1-27 | | | COLOR c : 3 | 0 | X |
| 1-28 | | | GROUND COLOR : 80 | — | X |
| 1-29 | | GROUND COLOR : 80 | COLOR a : 80 | — | X |
| 1-30 | | | COLOR b : 20 | 0.75 | O |
| 1-31 | | | COLOR c : 3 | 0.96 | O O |
| 1-32 | | | GROUND COLOR : 80 | 0 | X |

FIG. 15

| No. | TAPE TYPE (MATE-RIAL) | WHITE BAR COLOR : REFERECTANCE Ry [%] | BLACK BAR COLOR : REFERECTANCE Rx [%] | STANDARD VALUE (PCS VALUE) | CONFORMITY(O)/ NON-CONFORMITY (X) |
|---|---|---|---|---|---|
| 1-33 | C | COLOR a : 70 | COLOR a : 70 | 0 | X |
| 1-34 | | | COLOR b : 15 | 0.79 | O |
| 1-35 | | | COLOR c : 1 | 0.99 | O O |
| 1-36 | | | GROUND COLOR : 95 | — | X |
| 1-37 | | COLOR b : 15 | COLOR a : 70 | — | X |
| 1-38 | | | COLOR b : 15 | 0 | X |
| 1-39 | | | COLOR c : 1 | 0.97 | O O |
| 1-40 | | | GROUND COLOR : 95 | — | X |
| 1-41 | | COLOR c : 1 | COLOR a : 70 | — | X |
| 1-42 | | | COLOR b : 15 | — | X |
| 1-43 | | | COLOR c : 1 | 0 | X |
| 1-44 | | | GROUND COLOR : 95 | — | X |
| 1-45 | | GROUND COLOR : 95 | COLOR a : 70 | 0.26 | X |
| 1-46 | | | COLOR b : 15 | 0.84 | O |
| 1-47 | | | COLOR c : 1 | 0.99 | O O |
| 1-48 | | | GROUND COLOR : 95 | 0 | X |

F I G. 1 6

(AUTOMATIC BAR COLOR-SETTING TABLE)

| No. | TAPE TYPE (MATE-RIAL) | BAR COLOR DETERMINED | BAR COLOR FOR AUTOMATIC SETTING | REFLECT-ANCE DIFFER-ENCE (PCS VALUE) | CON-FORMITY(O)/ NON-CONFORMITY (X) | CORRE-SPOND-ING No. |
|---|---|---|---|---|---|---|
| 2-1 | A | COLOR a : 90 | COLOR c : 5 | 0.94 | O | 1-3 |
| 2-2 | | COLOR b : 25 | COLOR c : 5 | 0.80 | O | 1-7 |
| 2-3 | | COLOR c : 5 | COLOR a : 90 | 0.90 | O | 1-3 |
| 2-4 | | GROUND COLOR : 40 | COLOR c : 5 | 0.88 | O | 1-15 |
| 2-5 | B | COLOR a : 80 | COLOR c : 3 | 0.96 | O O | 1-19 |
| 2-6 | | COLOR b : 20 | COLOR c : 3 | 0.85 | O | 1-23 |
| 2-7 | | COLOR c : 3 | GROUND COLOR : 80 (COLOR a : 80) | 0.96 | O O | 1-31 |
| 2-8 | | | | | | (1-19) |
| 2-9 | | GROUND COLOR : 80 | COLOR c : 3 | 0.96 | O O | 1-31 |
| 2-10 | C | COLOR a : 70 | COLOR c : 1 | 0.99 | O O | 1-35 |
| 2-11 | | COLOR b : 15 | COLOR c : 1 | 0.97 | O O | 1-39 |
| 2-12 | | COLOR c : 1 | GROUND COLOR : 95 | 0.99 | O O | 1-47 |
| 2-13 | | GROUND COLOR : 95 | COLOR c : 1 | 0.99 | O O | 1-47 |

FIG. 17

| No. | TAPE TYPE (MATE-RIAL) | WHITE BAR COLOR | BLACK BAR COLOR | REFLECT-ANCE DIFFER-ENCE (PCS VALUE) | CON-FORMITY(O)/ NON-CONFORMITY (X) | CORRE-SPOND-ING No. |
|---|---|---|---|---|---|---|
| 3-1 | A | COLOR a : 90 | COLOR a : 90 | 0 | X | 1-1 |
| 3-2 | | | COLOR b : 25 | 0.72 | X | 1-2 |
| 3-3 | | | COLOR c : 5 | 0.94 | O | 1-3 |
| 3-4 | | | GROUND COLOR : 40 | 0.56 | X | 1-4 |
| 3-5 | | COLOR b : 25 | COLOR a : 90 | 0.72 | X | 1-2 |
| 3-6 | | | COLOR b : 25 | 0 | X | 1-6 |
| 3-7 | | | COLOR c : 5 | 0.80 | O | 1-7 |
| 3-8 | | | GROUND COLOR : 40 | 0.30 | X | 1-14 |
| 3-9 | | COLOR c : 5 | COLOR a : 90 | 0.94 | O | 1-3 |
| 3-10 | | | COLOR b : 25 | 0.80 | O | 1-7 |
| 3-11 | | | COLOR c : 5 | 0 | X | 1-11 |
| 3-12 | | | GROUND COLOR : 40 | 0.88 | O | 1-15 |
| 3-13 | | GROUND COLOR : 40 | COLOR a : 90 | 0.56 | X | 1-4 |
| 3-14 | | | COLOR b : 25 | 0.38 | X | 1-14 |
| 3-15 | | | COLOR c : 5 | 0.88 | O | 1-15 |
| 3-16 | | | GROUND COLOR : 40 | 0 | X | 1-16 |

F I G. 18

| STANDARD | JAN | UPC | ITF | NW-7 | CODE 39 |
|---|---|---|---|---|---|
| ENCODING METHOD | 4-VALUED LEVEL | 4-VALUED LEVEL | 2-VALUED LEVEL | 2-VALUED LEVEL | 2-VALUED LEVEL |
| CHARACTER | NUMERAL(0~9) | NUMERAL (0~9) | NUMERAL(0~9) | · NUMERAL(0~9)<br>· SYMBOL<br>· START/STOP CODE (ABCD) | · NUMERAL(0~9)<br>· SYMBOL<br>· ALPHABET<br>· START/STOP CODE |
| FEATURES | · VERSATILE READING DIRECTIONALITY<br>· 8,13 DIGIT FIXED LENGTH<br>· JAN IS OFTEN USED SUCH THAT A PLURARITY THEREOF ARE ARRANGED SIDE BY SIDE | | · HIGH RECORDING DENSITY<br>· PRINTABLE IN RATHER BAD PRINTING CONDITION | · A PLURARITY OF SYMBOLS CAN BE REPRESENTED BESIDES NUMERALS<br>· READABLE IF PRINTED WITH LOW PRINTING ACCURACY | · IN ADDITION TO NUMERALS AND SYMBOLS, ALPHABETIC CAPITAL LETTERS CAN BE REPRESENTED<br>· RELIABLE CHECK DIGIT |
| MAIN APPLICATION | RETAIL SALES | | INDUSTRY, RETAIL SALES | BLOOD, PHOTO, LIBRARY, EXPRESS PACKAGE | INDUSTRY, MEDICAL USE, HOUSEHOLD, ARMY |
| THINNEST BAR SIZE | 0.26mm | | 0.19mm | 0.165mm | 0.19mm |
| ACCEPTABLE THIN BAR-TO-THICK BAR RATIO | | | 1:2.2~1:3 | 1:2.2~1:3 | 1:2.2~1:3 |

| NUMERICAL VALUE INFORMATION (DECIMAL) | LEFT DATA CHARACTER | | RIGHT DATA CHARACTER & MODULAR CHECK CHARACTER |
|---|---|---|---|
| | ODD PARITY | EVEN PARITY | |
| 0 | 0001101 | 0100111 | 1110010 |
| 1 | 0011001 | 0110011 | 1100110 |
| 2 | 0010011 | 0011011 | 1101100 |
| 3 | 0111101 | 0100001 | 1000010 |
| 4 | 0100011 | 0011101 | 1011100 |
| 5 | 0110001 | 0111001 | 1001110 |
| 6 | 0101111 | 0000101 | 1010000 |
| 7 | 0111011 | 0010001 | 1000100 |
| 8 | 0110111 | 0001001 | 1001000 |
| 9 | 0001011 | 0010111 | 1110100 |

FIG. 19B

"0" (ODD PARITY) ONE CHARACTER     "2" (EVEN PARITY) ONE CHARACTER 0 0 0 1 1 0 1 | 0 0 1 1 0 1 1

7 MODULES
2 WHITE BARS
2 BLACK BARS

7 MODULES
2 WHITE BARS
2 BLACK BARS

| CODE | MODULE CONSTRUCTION | CODE | MODULE CONSTRUCTION |
|---|---|---|---|
| 0 | 00110 | 5 | 10100 |
| 1 | 10001 | 6 | 01100 |
| 2 | 01001 | 7 | 00011 |
| 3 | 11000 | 8 | 10010 |
| 4 | 00101 | 9 | 01010 |

| CHARACTER | BINARY NOTATION | BAR CODE CHARACTER |
|---|---|---|
| 0 | 0000011 | |
| 1 | 0000110 | |
| 2 | 0001001 | |
| 3 | 1100000 | |
| 4 | 0010010 | |
| 5 | 1000010 | |
| 6 | 0100001 | |
| 7 | 0100100 | |
| 8 | 0110000 | |
| 9 | 1001000 | |
| - | 0001100 | |
| S | 0011000 | |
| : | 1000101 | |
| / | 1010001 | |
| . | 1010100 | |
| + | 0010101 | |
| A | 0011010 | |
| B | 0101001 | |
| C | 0001011 | |
| D | 0001110 | |

FIG. 22

| CHARACTER | BINARY NOTATION | BAR CODE CHARACTER |
|---|---|---|
| 1 | 100100001 | |
| 2 | 001100001 | |
| 3 | 101100000 | |
| 4 | 000110001 | |
| 5 | 100110000 | |
| 6 | 001110000 | |
| 7 | 000100101 | |
| 8 | 100100100 | |
| 9 | 001100100 | |
| 0 | 000110100 | |
| A | 100001001 | |
| B | 001001001 | |
| C | 101001000 | |
| D | 000011001 | |
| E | 100011000 | |
| F | 001011000 | |
| G | 000001101 | |
| H | 100001100 | |
| I | 001001100 | |
| J | 000011100 | |
| K | 100000011 | |
| L | 001000011 | |

FIG. 23

| CHARACTER | BINARY NOTATION | BAR CODE CHARACTER |
|---|---|---|
| M | 101000010 | |
| N | 000010011 | |
| O | 100010010 | |
| P | 001010010 | |
| Q | 000000111 | |
| R | 100000110 | |
| S | 001000110 | |
| T | 000010110 | |
| U | 110000001 | |
| V | 011000001 | |
| W | 111000000 | |
| X | 010010001 | |
| Y | 110010000 | |
| Z | 011010000 | |
| - | 010000101 | |
| . | 110000100 | |
| (SP) | 011000100 | |
| $ | 010101000 | |
| / | 010100010 | |
| + | 010001010 | |
| % | 000101010 | |
| * | 010010100 | |

FIG. 24A
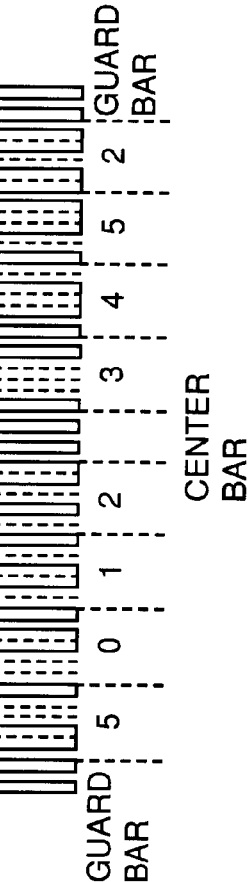
FIG. 24B
NUMERICAL
VALUE INFORMATION : ① [0123456] ② [9876543]
FIG. 24C
BAR CODE IMAGE :
① 
②

F I G. 2 5 A
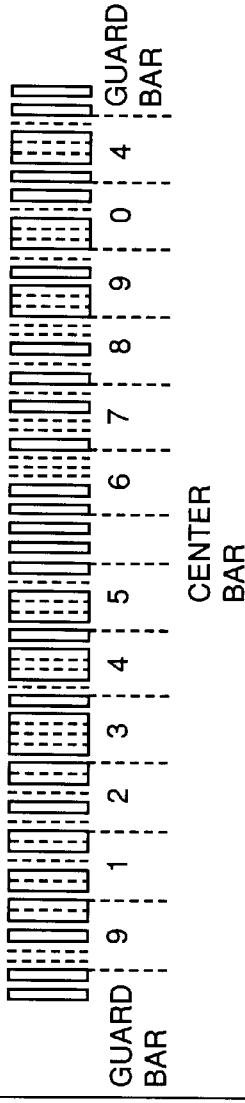
F I G. 2 5 B
NUMERICAL
VALUE INFORMATION : ① [0123456789 01]   ② [9876543210 98]
F I G. 2 5 C
BAR CODE IMAGE : ①   ②

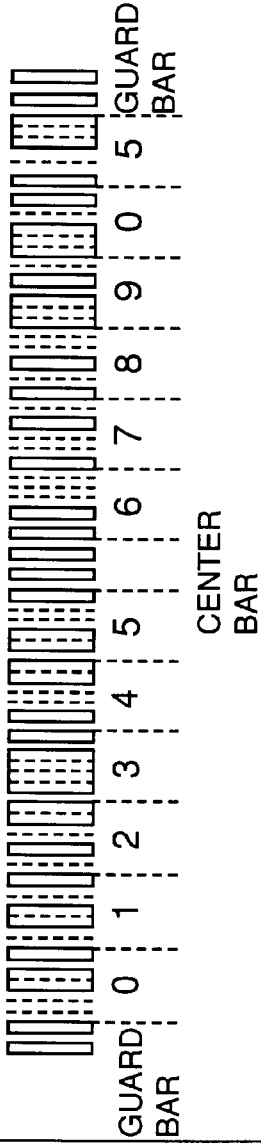

FIG. 27A
| STAN-DARD | NUMERICAL VALUE INFORMATION | BAR CODE PATTERN (BAR PATTERN) |
|---|---|---|
| UPC-E | [123643] | 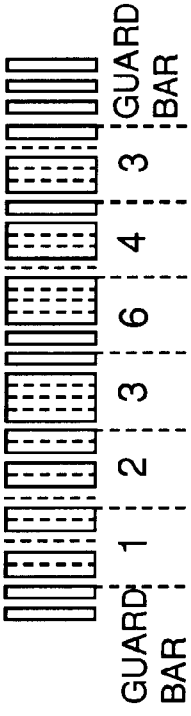 |
FIG. 27B
NUMERICAL VALUE INFORMATION : ① [012345]  ② [678901]
FIG. 27C
BAR CODE IMAGE :
① 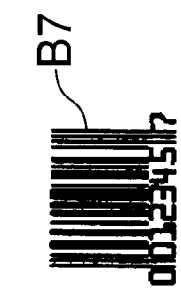  ② 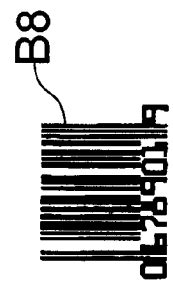

| STAN-DARD | NUMERICAL VALUE INFORMATION | BAR CODE PATTERN (BAR PATTERN) |
|---|---|---|
| ITF | [02345673] | START 2 (SPACES) 0 (BARS) 4 (SPACES) 3 (BARS) 6 (SPACES) 5 (BARS) 3 (SPACES) 7 (BARS) STOP |

NUMERICAL VALUE INFORMATION : ① [0123456789]　② [9876543210]　③ [1234567890]

BAR CODE IMAGE : ① ② ③

| STAN-DARD | NUMERICAL VALUE INFORMATION | BAR CODE PATTERN (BAR PATTERN) |
|---|---|---|
| NW-7 | [123-] | A(START) CG 1 CG 2 CG 3 CG — A(STOP) |

NUMERICAL VALUE INFORMATION : ① [-$:/+.]
② [0123456789]

BAR CODE IMAGE :

① A-$:/+.4B
② A0123456789 2B

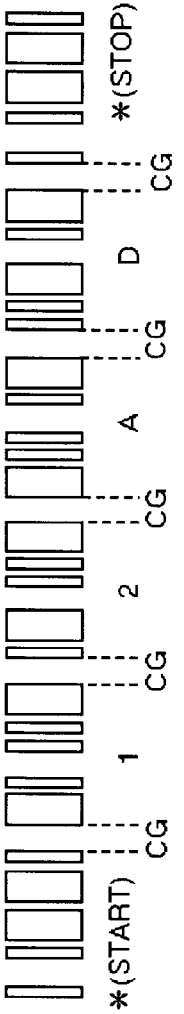
FIG. 30A
FIG. 30B
FIG. 30C

F I G. 33A 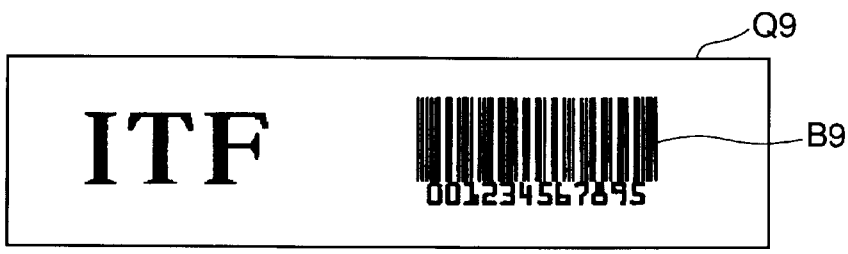
F I G. 33B 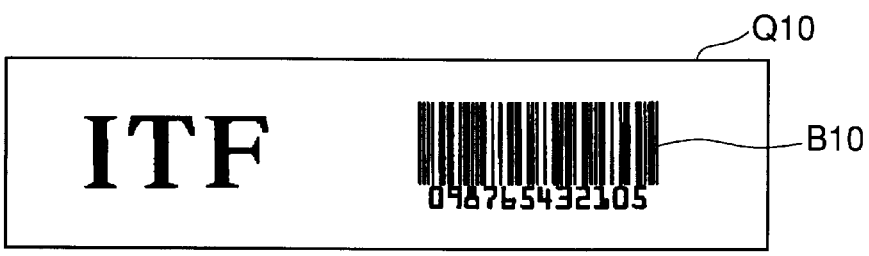
F I G. 33C 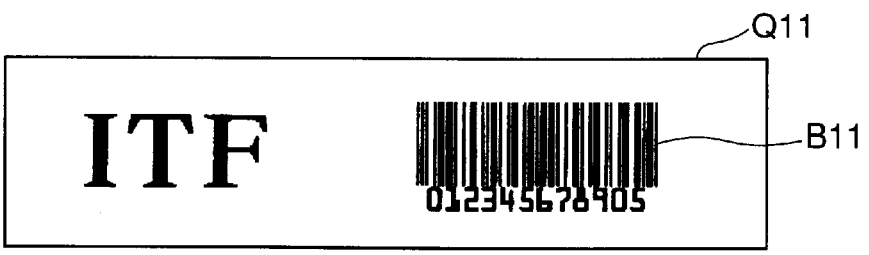

FIG. 35

| TOP LEFT | TOP CENTER | TOP RIGHT |
|---|---|---|
| MIDDLE LEFT | MIDDLE CENTER | MIDDLE RIGHT |
| BOTTOM LEFT | BOTTOM CENTER | BOTTOM RIGHT |

FIG. 38
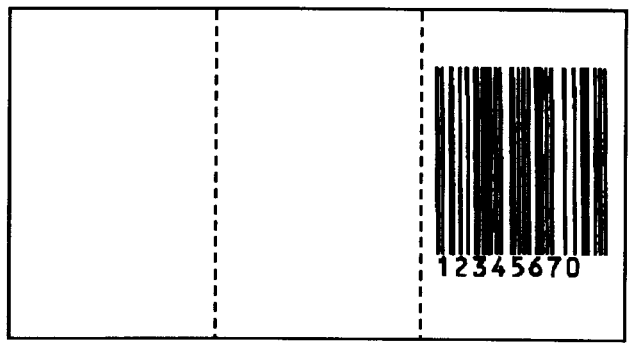
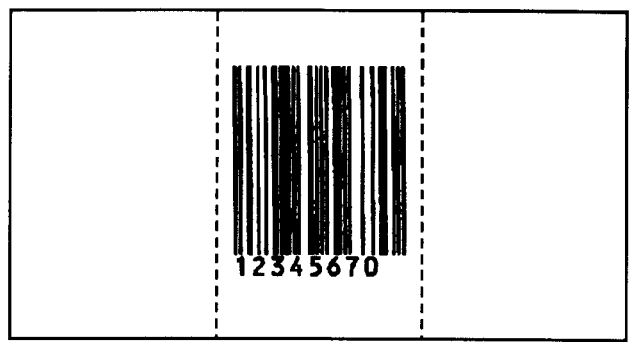
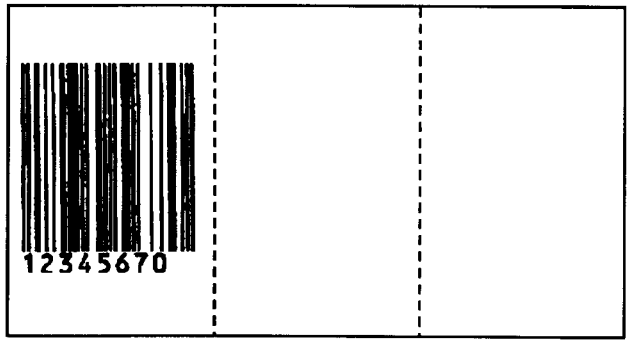

FIG. 41A
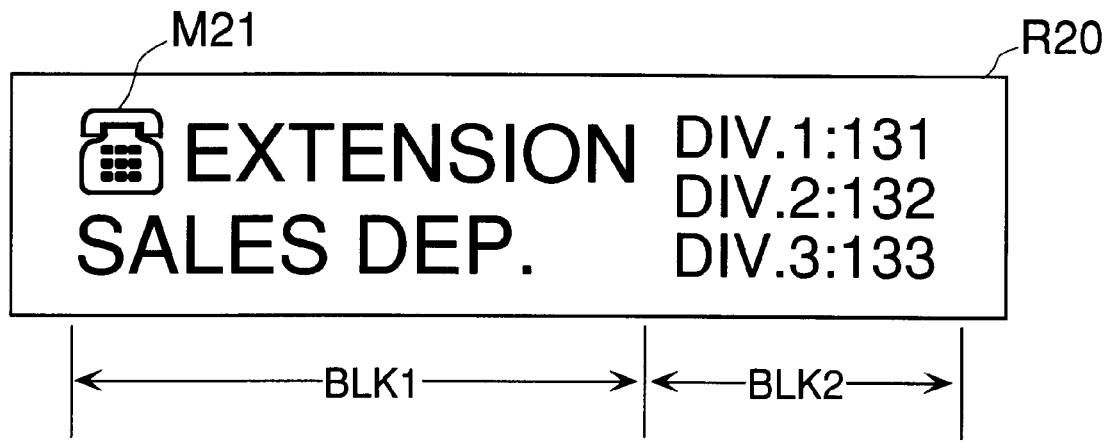
FIG. 41B
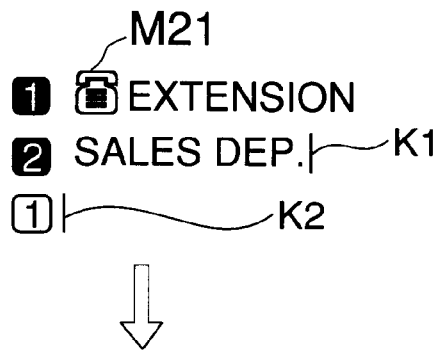

M21  K1
① 📞EXTENSION
② SALES DEP.
① DIV.1:131
② DIV.2:132
③ DIV.3:133

⇩

M21
① 📞 K2
① |EXTENSION
② SALES DEP.
① DIV.1:131
② DIV.2:132
③ DIV.3:133

FIG. 44A
- 1 JAN-8
- 1 ※ ～M0

FIG. 44B
- 1 ※ ～M0
- 1 JAN-8

FIG. 44C
- 1 ※ ～M0
- 1 🍅Tomato ～M1
- 2 ¥50

FIG. 44D
- 1 ※ ～M0 / M1
- 2 🍅Tomato
- 3 ¥50

FIG. 44E
- 1 🍅Tomato ～M1
- 2 ※ ～M0
- 3 ¥50

FIG. 44F
- 1 ※ ～M0
- 2 ⌴ ⌴🍅Tomato ～M1
- 3 ⌴ ⌴¥50

FIG. 44G
- 1 🍅Tomato ～M1
- 2 ¥50
- 1 ※ ～M0

BAR CODE PRINTER THAT AUTOMATICALLY SETS ONE BAR COLOR IN RESPONSE TO ANOTHER BAR COLOR

BACKGROUND OF THE INVENTION

1. Field of the Invention

This invention relates to an image printing method and device for printing a bar code image representative of a bar code.

2. Prior Art

A so-called bar code is a technique for describing characters (alphabet, numerals, symbols, etc.) by a combination of parallel (vertical) lines (hereinafter referred to as "bars") of different thickness (width) or arranged at different intervals. Each bar code (symbol) represents binary information which can be optically read by optical reading means, such as an optical scanner provided in a bar code reader and the like. Some bar code readers integrate the function of error detection, and are capable of reading bar codes from any direction. These bar codes are printed on labels and the like, which are attached to books, food products, and like articles, or directly printed on surfaces of articles (or surfaces of wrapper for articles), thereby permitting them to be input by input means (reading means) which quickly inputs binary information, at libraries, hospitals, groceries, etc.

The two values (0 and 1) of the binary information are distinguished from each other by difference in reflectance of darker and lighter portions of the bar code. The darker portions having a lower reflectance (referred to as "black bars") are recognized (read) as one (e.g. 1) of the binary value, while the lighter portions having a higher reflectance (referred to as "white barsw") are recognized (read) as the other (e.g. 0) of the same. The conditions concerning reflectance of light required for permitting bar codes to be read (recognized) are standardized as a standard of the bar code print quality (hereinafter referred to as "the bar code print quality standard", see FIG. 12).

The bar code is a kind of image, and hence images of bar codes (bar code images) can be formed and printed by using a printing apparatus, such as a printer which can print images. In the case of printing apparatuses capable of printing color images, it is possible to print colorful bar code images by setting different colors to each bar having a lower reflectance and each bar having a higher reflectance, respectively. To do this, it is possible, in principle, for store managers to devise various bar codes having desired colors suitable for articles sold at his store, and print them as bar code images on articles, or on labels which are attached to articles.

However, ordinary users have no idea of the bar code print quality standard, and therefore, if they form and print bar code images having desired colors, the images can fail to conform to the bar code print quality standard, which prevents the bar code readers and the like from reading or recognizing them as bar codes. Even if a user knows about the standard or details thereof, it is a troublesome and time-consuming work to set colors of a bar code while paying attention to the standard.

SUMMARY OF THE INVENTION

It is an object of the invention to provide an image printing method and device which is capable of easily printing a bar code image having colors conforming to a bar code print quality standard.

To attain the above object, according to a first aspect of the invention, there is provided a method of printing an image, comprising the steps of:

setting a bar code pattern defining the arrangement of bars of two kinds in a bar code, the bars of two kinds including at least one bar of a first kind and at least one bar of a second kind, the at least one bar of the first kind being different in optical reflectance from the at least one bar of the second kind;

setting a first bar color which defines a printing color of the at least one bar of the first kind;

setting a second bar color which defines a printing color of the at least one bar of the second kind, based on a predetermined bar code print quality standard which defines conditions concerning the optical reflectance of the bars of two kinds, such that a combination of the first bar color and the second bar color conforms to the predetermined bar code print quality standard; and printing a bar code image which is a print image of the bar code, on a printing object, based on the bar code pattern, the first bar color, and the second bar color.

To attain the above object, according to a second aspect of the invention, there is provided an image printing device comprising:

a bar code pattern-setting section for setting a bar code pattern defining the arrangement of bars of two kinds in a bar code, the bars of two kinds including at least one bar of a first kind and at least one bar of a second kind, the at least one bar of the first kind being different in optical reflectance from the at least one bar of the second kind;

a first bar color-setting section for setting a first bar color which defines a printing color of the at least one bar of the first kind;

a second bar color-setting section for setting a second bar color which defines a printing color of the at least one bar of the second kind, based on a predetermined bar code print quality standard which defines conditions concerning the optical reflectance of the bars of two kinds, such that a combination of the first bar color and the second bar color conforms to the predetermined bar code print quality standard; and a bar code image-printing section for printing a bar code image which is a print image of the bar code, on a printing object, based on the bar code pattern, the first bar color, and the second bar color.

According to the image printing method and device, a bar code pattern defining the arrangement of bars of two kinds in a bar code is set, the bars of two kinds including at least one bar of a first kind and at least one bar of a second kind, the at least one bar of the first kind being different in optical reflectance from the at least one bar of the second kind. A first bar color is set which defines a printing color of the at least one bar of the first kind. A second bar color which defines a printing color of the at least one bar of the second kind is set based on a predetermined bar code print quality standard which defines conditions concerning the optical reflectance of the bars of two kinds, such that a combination of the first bar color and the second bar color conforms to the predetermined bar code print quality standard. Then, a bar code image is printed which is a print image of the bar code, on a printing object, based on the bar code pattern, the first bar color, and the second bar color. That is, if the first bar color is set, the second bar color is set such that a combination of the first bar color and the second bar color conforms to the predetermined bar code print quality standard. Therefore, even if the user has no idea of the bar code print quality standard(or does not pay attention to the bar code print quality standard), he can easily print a bar code image having colors conforming to the bar code print quality standard, only by setting the bar code pattern and the first bar color.

To attain the above object, according to a third aspect of the invention, there is a method of printing an image, comprising the steps of:

setting a bar code pattern defining the arrangement of bars of two kinds in a bar code, the bars of two kinds including at least one bar of a first kind and at least one bar of a second kind, the at least one bar of the first kind being different in optical reflectance from the at least one bar of the second kind;

setting a first bar color which defines a printing color of the at least one bar of the first kind;

setting a second bar color which defines a printing color of the at least one bar of the second kind;

determining, based on a predetermined bar code print quality standard which defines conditions concerning the optical reflectance of the bars of two kinds, whether a combination of the first bar color and the second bar color conforms to the predetermined bar code print quality standard; and printing a bar code image which is a print image of the bar code, on a printing object, based on the bar code pattern, the first bar color, and the second bar color, when it is determined that the combination conforms to the predetermined bar code print quality standard.

To attain the above object, according to a fourth aspect of the invention, there is provided an image printing device comprising:

a bar code pattern-setting section for setting a bar code pattern defining the arrangement of bars of two kinds in a bar code, the bars of two kinds including at least one bar of a first kind and at least one bar of a second kind, the at least one bar of the first kind being different in optical reflectance from the at least one bar of the second kind;

a first bar color-setting section for setting a first bar color which defines a printing color of the at least one bar of the first kind;

a second bar color- setting section for setting a second bar color which defines a printing color of the at least one bar of the second kind;

a bar color conformity-determining section for determining, based on a predetermined bar code print quality standard which defines conditions concerning the optical reflectance of the bars of two kinds, whether a combination of the first bar color and the second bar color conforms to the predetermined bar code print quality standard; and a bar code image-printing section for printing a bar code image which is a print image of the bar code, on a printing object, based on the bar code pattern, the first bar color, and the second bar color, when it is determined that the combination conforms to the predetermined bar code print quality standard.

According to the image printing method and device, a bar code pattern is set which defines the arrangement of bars of two kinds in a bar code, the bars of two kinds including at least one bar of a first kind and at least one bar of a second kind, the at least one bar of the first kind being different in optical reflectance from the at least one bar of the second kind. A first bar color is set which defines a printing color of the at least one bar of the first kind. A second bar color is set which defines a printing color of the at least one bar of the second kind. It is determined based on a predetermined bar code print quality standard which defines conditions concerning the optical reflectance of the bars of two kinds, whether a combination of the first bar color and the second bar color conforms to the predetermined bar code print quality standard. Then, a bar code image which is a print image of the bar code is printed on a printing object based on the bar code pattern, the first bar color, and the second bar color, when it is determined that the combination conforms to the predetermined bar code print quality standard.

That is, each of two colors of the bars of two kinds can be set, and the bar code is printed on condition that a combination of these colors conforms to the predetermined bar code print quality standard. Therefore, even if the user has no idea of the bar code print quality standard (or does not pay attention to the bar code print quality standard), he can easily print a bar code image having colors conforming to the bar code print quality standard, only by setting the bar code pattern and the colors of the bars of two kinds. In this case, when the combination of these colors does not conform to the predetermined bar code print quality standard, any suitable processing may be defined as desired, e.g. automatic adjustment of either of the colors of the bars of two kinds for printing, notifying the use of nonconformity of the combination of the colors, prompting the user to set the colors again, simply terminating the process without printing, or any suitable combination of these. In any of these cases, it is possible to save the trouble of printing a bar code image which does not conform to the bar code print quality standard, or the resulting waste of the printing object.

Preferably, the method further includes the step of notifying that the combination does not conform to the predetermined bar code print quality standard, when it is determined that the combination does not conform to the predetermined bar code print quality standard.

Preferably, the image printing device further includes a bar color nonconformity-notifying section for notifying that the combination does not conform to the predetermined bar code print quality standard, when it is determined that the combination does not conform to the predetermined bar code print quality standard.

According to these preferred embodiment of the respective third and fourth aspects of the invention, it is notified that the combination does not conform to the predetermined bar code print quality standard, when it is determined that the combination does not conform to the predetermined bar code print quality standard. Therefore, the user can be easily aware of the nonconformity of the set colors to the predetermined bar code print quality standard, which permits the user to quickly cope with the problem, e.g. by changing color settings. That is, conventionally, the bar code image is actually printed and a test concerning the readability o f the bar code is conducted. Only after the test, it can be determined whether the combination of colors of the bars of two kinds does not provide required print quality allowing the bar code to be properly read, and then, the process should be carried out again starting with the setting of colors of the bars of two kinds. In contrast, according to this preferred embodiment of the present invention, at a time a combination of colors of bars of two kinds are set, it can be determined whether or not the combination conforms to the predetermined bar code print quality standard, and if the combination does not conform to the standard, the use is notified of the fact. Therefore, the use can promptly cope with the problem.

Preferably, the method further includes the steps of:

defining at least one of a set of reflectance values of possible colors of the bars of two kinds, a set of standard values based on the predetermined bar code print quality standard and corresponding respectively to combinations of the possible colors of the bars of two kinds, information of conformity or nonconformity of each of the combinations, and a set of the combinations conforming to the predetermined bar code print quality standard, in a manner associated with a corresponding one of types of the printing object; and detecting a type of the printing object in use.

Preferably, the image printing device further includes a storage device for storing information defining at least one of a set of reflectance values of possible colors of the bars of two kinds, a set of standard values based on the predetermined bar code print quality standard and corresponding respectively to combinations of the possible colors of the bars of two kinds, information of conformity or nonconformity of each of the combinations, and a set of the combinations conforming to the predetermined bar code print quality standard, in a manner associated with a corresponding one of types of the printing object, and a printing object type-detecting section for detecting a type of the printing object in use.

According to these preferred embodiment of the first to fourth aspects of the invention, at least one of a set of reflectance values of possible colors of the bars of two kinds, a set of standard values based on the predetermined bar code print quality standard and corresponding respectively to combinations of the possible colors of the bars of two kinds, information of conformity or nonconformity of each of the combinations, and a set of the combinations conforming to the predetermined bar code print quality standard, is/are defined in a manner associated with a corresponding one of types of the printing object, and a type of the printing object in use is detected. That is, if values of optical reflectance are defined in a manner associated each type of printing object, it is easy to determine a standard value (PCS value) corresponding to the type of printing object, and further, the standard value itself may be defined in a manner associated with the type of printing object. Further, if the values of reflectance and standard values are defined, it is easy to determine whether the combination conforms to the standard, and further the conformity or nonconformity to the standard itself may be set in a manner associated with the type of printing object. Further, possible combinations of colors each conforming to the standard may be defined in a manner associated with each type of printing object, and the judgment of conformity or nonconformity can be easily carried out such that if the set combination of colors belongs to the defined possible combinations, it may be judged to conform to the standard, or if the set combination of colors does not belong to the defined possible combinations, it may be judged not to conform to the standard.

Therefore, if at least one of these definitions is/are provided, it is easy to set a combination of colors of bars such that the combination conforms to the predetermined bar code print quality standard (first and second aspects of the invention), or determine whether or not the combination conforms to the predetermined bar code print quality standard (third and fourth aspects of the invention). Therefore, according to these preferred embodiments, the user can easily print a bar code image having colors conforming to bar code print quality standard without being conscious of the type of printing object, even if he has no idea of bar code print quality standard (or does not pay attention to the bar code print quality standard).

Preferably, the method further includes the steps of:
defining at least one of a set of reflectance values of possible colors of the bars of two kinds, a set of standard values based on the predetermined bar code print quality standard and corresponding respectively to combinations of the possible colors of the bars of two kinds, information of conformity or nonconformity of each of the combinations, and a set of the combinations conforming to the predetermined bar code print quality standard, in a manner associated with a corresponding one of types of the printing object; and setting a type of the printing object in use.

Preferably, the image printing device further includes a storage device for storing information defining at least one of a set of reflectance values of possible colors of the bars of two kinds, a set of standard values based on the predetermined bar code print quality standard and corresponding respectively to combinations of the possible colors of the bars of two kinds, information of conformity or nonconformity of each of the combinations, and a set of the combinations conforming to the predetermined bar code print quality standard, in a manner associated with a corresponding one of types of the printing object, and a printing object type-setting section for setting a type of the printing object in use.

According to these preferred embodiments of the first to fourth aspects of the invention, at least one of a set of reflectance values of possible colors of the bars of two kinds, a set of standard values based on the predetermined bar code print quality standard and corresponding respectively to combinations of the possible colors of the bars of two kinds, information of conformity or nonconformity of each of the combinations, and a set of the combinations conforming to the predetermined bar code print quality standard, is/are defined in a manner associated with a corresponding one of types of the printing object. That is, similarly to the above, since at least one of these definitions is/are provided, it is easy to set a combination of colors of bars such that the combination conforms to the predetermined bar code print quality standard (first and second aspects of the invention), or determine whether or not the combination conforms to the predetermined bar code print quality standard (third and fourth aspects of the invention). According to these preferred embodiments, since the type of printing object is set by the user, even if the user has no idea of bar code print quality standard (or does not pay attention to the bar code print quality standard), he can easily print a bar code image having colors conforming to bar code print quality standard, only by setting the type of printing object.

Preferably, the method includes the steps of:
defining a plurality of types of bar code which are different in a method of arranging the bars of two kinds in the bar code from each other, and the step of setting the bar code pattern includes the step of selecting a desired one of the plurality of types of bar code.

Preferably, the image printing device includes a storage device for storing information defining a plurality of types of bar code which are different in a method of arranging the bars of two kinds in the bar code from each other, and the bar code pattern-setting section includes a bar code type-selecting section for selecting a desired one of the plurality of types of bar code.

According to these preferred embodiments of the first to fourth aspects of the invention, there are defined a plurality of types of bar code which are different in a method of arranging the bars of two kinds in the bar code from each other, and a desired one of the plurality of types of bar code is selected. Therefore, it is easy to set the method of arranging bars only by selecting a desired type of bar code, and set the bar code pattern based on the selected method.

Preferably, the bar code represents numerical value information such that each bar of the first kind corresponds to one of predetermined two numerical values and each bar of the second kind corresponds to another of the predetermined two numerical values, and the step of setting the bar code pattern includes the step of inputting the numerical value information.

Preferably, the bar code represents numerical value information such that each bar of the first kind corresponds to one of predetermined two numerical values and each bar of the second kind corresponds to another of the predetermined two numerical values, and the bar code pattern-setting section includes a numerical value-inputting section for inputting the numerical value information.

According to this preferred embodiment of each of the first to fourth aspects of the invention, the bar code represents numerical value information such that each bar of the first kind corresponds to one of predetermined two numerical values and each bar of the second kind corresponds to another of the predetermined two numerical values, and the numerical value information is input. Therefore, it is possible to easily set the bar code pattern by inputting the numerical value information.

Preferably, the predetermined two numerical values are 0 and .

According to this preferred embodiment of each of the first to fourth aspects of the invention, the predetermined two numerical values are 0 and 1. That is, the numerical value information is in binary form, and by inputting desired numerical value information, bars of one of the two kinds can be assigned to respective positions corresponding to digits 0, and bars of the other of the two kinds can be assigned to respective positions corresponding digits 1, when the numerical value information is represented by using binary digits. This makes it possible to easily set the bar code pattern.

Preferably, the method includes the steps of setting one of the first bar color and the second bar color to a printing color of a background of the bar code image.

Preferably, the image printing device includes a background color-setting section for setting one of the first bar color and the second bar color to a printing color of a background of the bar code image.

According to these preferred embodiments, one of the first bar color and the second bar color is set to a printing color of a background of the bar code image. This causes the bars of the first kind or the bars of the second kind to assume the same color as the printing color of the background (background color), and hence a bar code image can be obtained in which one of the first bar color and the second bar color is the color of bars, and the other of them is the color of the background on which the bars are painted. In this case, a bar code image having a desired color can be obtained in which the bar code is made conspicuous by setting its background color conspicuous against the color of an article, or inversely, a bar code is made inconspicuous by setting its background color inconspicuous against the color of an article.

Preferably, the printing object is a material permitting a portion having the bar code image printed thereon to be affixed to an object as a label.

According to this preferred embodiment of each of the first to fourth aspects of the invention, the printing object is a material permitting a portion having the bar code image printed thereon to be affixed to an object as a label. That is, the present invention can be applied to a label printing apparatus (label writer) for forming labels on which print images are printed.

More preferably, the method further includes the step of setting a printing position of the bar code image on the label.

More preferably, the image printing device further includes a printing position-setting section for setting a printing position of the bar code image on the label.

According to these preferred embodiments of the first to fourth aspects of the invention, a printing position of the bar code image is set on the label. Therefore, it is possible to print the bar code image at a desired position on the label.

Preferably, the bar code image is printed by an ink jet printing method.

According to this preferred embodiment of each of the first to fourth aspects of the invention, the print image is printed by the ink jet printing method. That is, the invention can be applied to a tape printing apparatus which prints print images by the ink jet printing method.

Preferably, the printing object is a tape.

According to this preferred embodiment of each of the first to fourth aspects of the invention, the printing object is a tape. That is, the invention can be applied to a tape printing apparatus which prints a print image on a tape.

Preferably, the bar code image is printed by decomposing the bar code image into a plurality of basic colors, and the plurality of basic colors include three primary colors.

According to this preferred embodiment of each of the first to fourth aspects of the invention, the bar code image is printed by decomposing the bar code image into a plurality of basic colors, and the plurality of basic colors include three primary colors. As the three primary colors for printing, it is possible to employ a combination of e.g. C (cyan), M (magenta), and Y (yellow). In this case, by a so-called subtractive color mixing process, various tones of colors can be expressed, and hence print images can be printed in various tones. Therefore, it is possible to print color bar code images suitable for expressing colors by reflected light, such as those formed by various XY plotters, printers, and the like.

More preferably, the plurality of basic colors further include a basic color corresponding to a mixed color of the three primary colors.

According to this preferred embodiment of each of the first to fourth aspects of the invention, the plurality of basic colors further include a basic color corresponding to a mixed color of the three primary colors. When color images are printed by using the plurality of basic colors, e.g. a mixed color of C (cyan), M (magenta), and Y (yellow), K (black) is formed. In general, provision of ink of K (black) makes it possible to obtain a beautiful tone of black color than the use of the K (black) formed by mixing the primary colors. Therefore, since the plurality of basic colors include the basic color corresponding to the mixed color of the three primary colors, a beautiful color image can be printed as the bar code image (print image) by using the four basic colors.

The above and other objects, features, and advantages of the invention will become more apparent from the following detailed description taken in conjunction with the accompanying drawings.

BRIEF DESCRIPTION OF THE DRAWINGS

FIG. 12 is a table showing an example of a bar code print quality standard;

FIG. 13 is a table showing an example of a bar code print quality standard value table;

FIG. 14 is a table similar to FIG. 13 and continued therefrom;

FIG. 15 is a table similar to FIG. 13 and continued from FIG. 14;

FIG. 16 is a table showing an example of an automatic bar color-setting table;

FIG. 17 a table showing an example of a bar color conformity determination table;

FIG. 18 is a table showing an example of types of bar codes which are classified according to standards defining the composition and arrangement of two kinds of bars forming each bar code;

FIG. 19B is a diagram which is useful in explaining the configuration of bars and the bar code composition and pattern, formed based on the FIG. 19A numerical value information and binary digits, and the relationship between the bars and the bar codes;

FIG. 20B is a diagram which is useful in explaining the configuration of bars and the bar code composition and pattern, formed based on the FIG. 20A numerical value information and binary digits, and the relationship between the bars and the bar codes;

FIG. 21 is a table showing numerical value information, binary digits, the configuration of bars, the composition and pattern of each bar code, and the relationship therebetween, based on the standard of "NW-7";

FIG. 22 is a table showing numerical value information, binary digits, the configuration of bars, the composition and pattern of each bar code, and the relationship therebetween, based on the standard of "CODE39";

FIG. 23 is a table similar to FIG. 22 and continued therefrom;

FIGS. 24A to 24C are diagrams useful in explaining the standard of JAN-8, in which:

FIG. 24A is a table showing the relationship between numerical value information and a bar code pattern formed based on the standard of "JAN-8"; and FIGS. 24B and 24C are diagrams showing examples of numerical value information (decimal), and bar code images which are formed based on the standard of "JAN-8" in a manner corresponding to FIG. 24B examples, respectively;

FIGS. 25A to 25C are diagrams similar to FIGS. 24A to 24C, respectively, which are useful in explaining the standard of "JAN-13";

FIGS. 26A to 26C are diagrams similar to FIGS. 24A to 24C, respectively, which are useful in explaining the standard of "UPC-A";

FIGS. 27A to 27C are diagrams similar to FIGS. 24A to 24C, respectively, which are useful in explaining the standard of "UPC-E";

FIGS. 30A to 30C are diagrams similar to FIGS. 24A to 24C, respectively, which are useful in explaining the standard of "CODE39"

FIGS. 33A to 33C are diagrams similar to FIGS. 31A to 31D, in which bar code images are formed based on the standard of "ITF";

FIG. 35 is a diagram illustrating menu options of a printing position for selecting printing positions for printing bar code images, which is useful in explaining the relationship between examples of the options and printing positions designated by selecting the options;

FIGS. 38 is a diagram similar to FIG. 36, which corresponds to FIG. 37;

FIG. 41A is a diagram similar to FIG. 40A, which shows another example of a label printed with normal letter string images;

FIG. 41B is a diagram similar to FIG. 40B, which includes an example of text data entered to provide two paragraphs for printing normal letter string images;

FIGS. 44A to 44G are diagrams which are useful in explaining examples of text edit screens which contains display of bar code marks;

DETAILED DESCRIPTION

Figure 1:
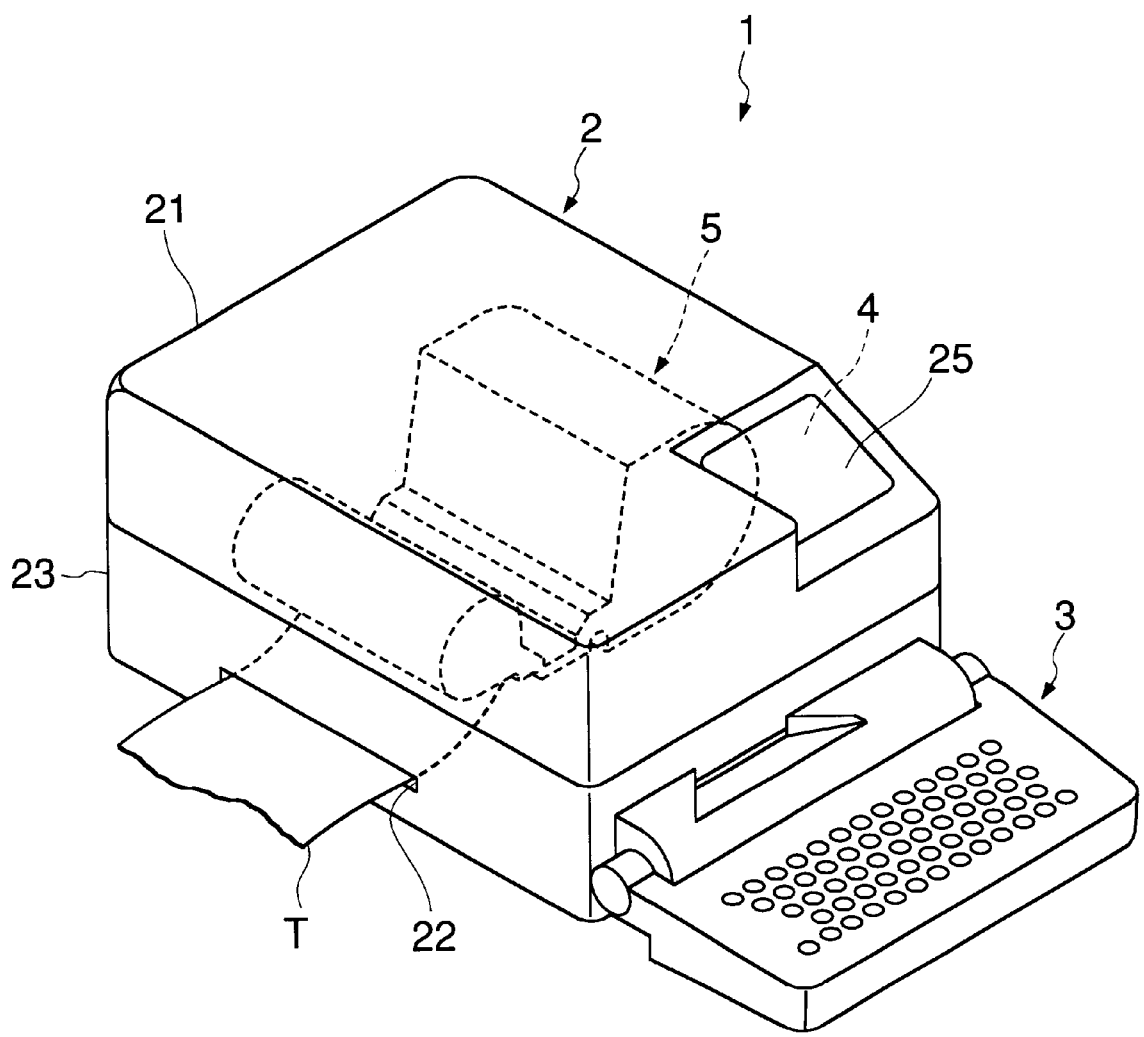
FIG. 1 is a perspective view of an appearance of a tape printing apparatus to which is applied an image printing method and device according to an embodiment of the invention.
Figure 2:
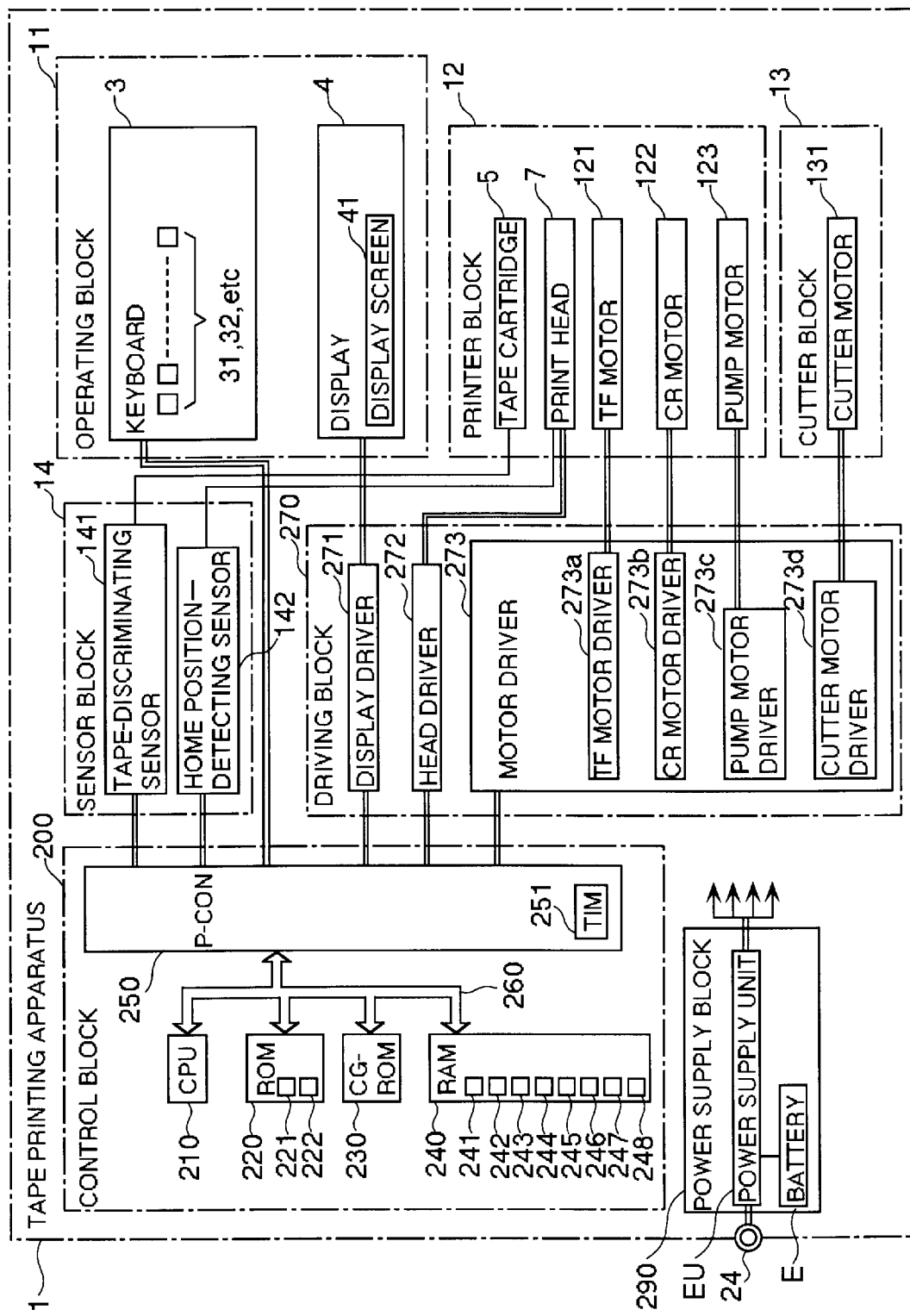
FIG. 2 is a block diagram of a control system of the FIG. 1 tape printing apparatus.

The invention will now be described in detail with reference to the drawings showing an embodiment thereof. In the embodiment, an image printing method and device according to the invention is applied to a tape printing apparatus. FIG. 1 is a perspective view of an appearance of the tape printing apparatus, and FIG. 2 is a block diagram of the control system thereof.

The tape printing apparatus 1 is capable of carrying out color printing of a print image entered via a keyboard thereof on a printing tape T1 by an ink jet printing method as well as cutting off the printed portion or strip of the printing tape T1 to thereby produce a label. Further, when not only a printing tape T1 but also a laminating tape T2 (see FIGS. 3 and 4) is mounted in this tape printing apparatus 1, the apparatus 1 is also capable of laminating the laminating tape T2 to the printed portion of the printing tape T1 and cutting off the printing tape T1 laminated with the laminating tape T2 to thereby form a laminated label. Hereinafter, a type formed of the printing tape T1 alone and a type formed of both the printing tape T1 and the laminating tape T2 will be generically referred to as "the tape T".

The printing tape T1 is comprised of a substrate tape, an adhesive layer coated on an underside surface of the substrate tape, and a peel-off paper tape affixed to the adhesive layer. The substrate tape is formed of a material which is capable of readily absorbing ink, such as paper, a cloth, paper with a coated layer, or a film with a coated layer. The adhesive layer is used for affixing the printing tape T1 as a label to an object article, such as a file cabinet and the like, while the peel-off paper tape is used for preventing dust or dirt from depositing on the adhesive layer.

On the other hand, the laminating tape T2 is comprised of a substrate tape and an adhesive layer coated on an underside surface of the substrate tape. The substrate tape is formed of a transparent film having a thickness of approximately 16 to 38 $\mu$m. The printing tape T1 and the laminating tape T2 are fabricated to have an approximately identical width and affixed to each other in a manner such that lateral sides thereof are aligned one upon the other. Actually, the laminating tape T2 has a slightly smaller width (by approximately 0.3 mm) than the printing tape T1 such that slight lateral displacement of the laminating tape T2 can be accommodated when the same is affixed to the printing tape T1.

There are provided several kinds of tape T having various tape widths (approximately 4.5 to 96 mm), each of which is supplied in a state received in a tape cartridge 5 therefor. A print image having a resolution of 24 to 1024 dots in the direction of the width thereof is printed on the printing tape T, dependent on the width thereof. It should be noted that there are provided still other tapes T which are different in material or have ground colors other than white and that it is possible to use at least several tens of kinds of tape T including ones to be adopted in the future. The tape cartridges 5 are classified into a type which can load both a printing tape T1 and a laminating tape T2 therein (see FIG. 4) and a type which can load only a printing tape T1 therein. Each of the two types includes three kinds of tape cartridges i.e. "Large", "Medium" and "Small" cartridges, which are different in height, i.e. width of tapes contained.

Referring first to FIG. 1, the tape printing apparatus 1 is comprised of a body 2, a keyboard 3 mounted on a front-side portion of the body 2, a tape cartridge 5 accommodating the tape T (the printing tape T1 and the laminating tape T2) and an ink cartridge 8 (see FIG. 3) filled with inks of four colors. The tape cartridge 5 and the ink cartridge 8 are removably loaded in the body 2. The body 2 includes an apparatus casing 23. The upper part of the apparatus casing 23 is in the form of a lid 21 which can be opened and closed for loading and removing the tape cartridge 5 and the ink cartridge 8. The apparatus casing 23 has a sidewall formed with a tape exit 22 in the form of a slit via which the tape T is delivered out of the apparatus 1.

The keyboard 3 is hinged on a lower portion of a front surface of the body 2 of the tape printing apparatus 1 such that it can be brought either to an upright position or to a horizontal position for use with the body 2. The keyboard 3 is brought to the horizontal position when the apparatus 1 is in use, while it is held in the upright or folded position to cover the front surface of the apparatus 1 when the apparatus 1 is carried by a user. The lid 21 has a small window 25 formed in a right-side front portion thereof in a manner corresponding to a display 4 arranged within the body 2. The keyboard 3 and the display 4 will be described in detail hereinafter.

Further, as shown in FIG. 2, the tape printing apparatus 1 is comprised of an operating block 11 basically including the keyboard 3 and the display 4 for interfacing between the user and the apparatus 1, a printer block 12 including an ink jet print head 7 for printing on the tape T (printing tape T1) unwound from the tape cartridge 5, a cutter block 13 for cutting off the tape T after printing, a sensor block 14 including various sensors for carrying out various kinds of detection, a driving block 270 including various drivers for driving circuits of respective blocks, a power supply block 290, and a control block 200 for controlling the blocks within the tape printing apparatus 1.

Therefore, the apparatus casing 23 accommodates not only the printer block 12, the cutter block 13, and the sensor block 14, but also a circuit board, not shown, on which are mounted a circuit of the power supply block 290 as well as circuits of the driving block 270 and the control block 200. The power supply block 290 has a power supply unit EU connected to an AC adapter port 24, or a battery E, such as a nicad battery, which can be mounted and removed from outside. The power supply unit EU supplies power to the electric and electronic components of the tape printing apparatus 1.

Figure 3:
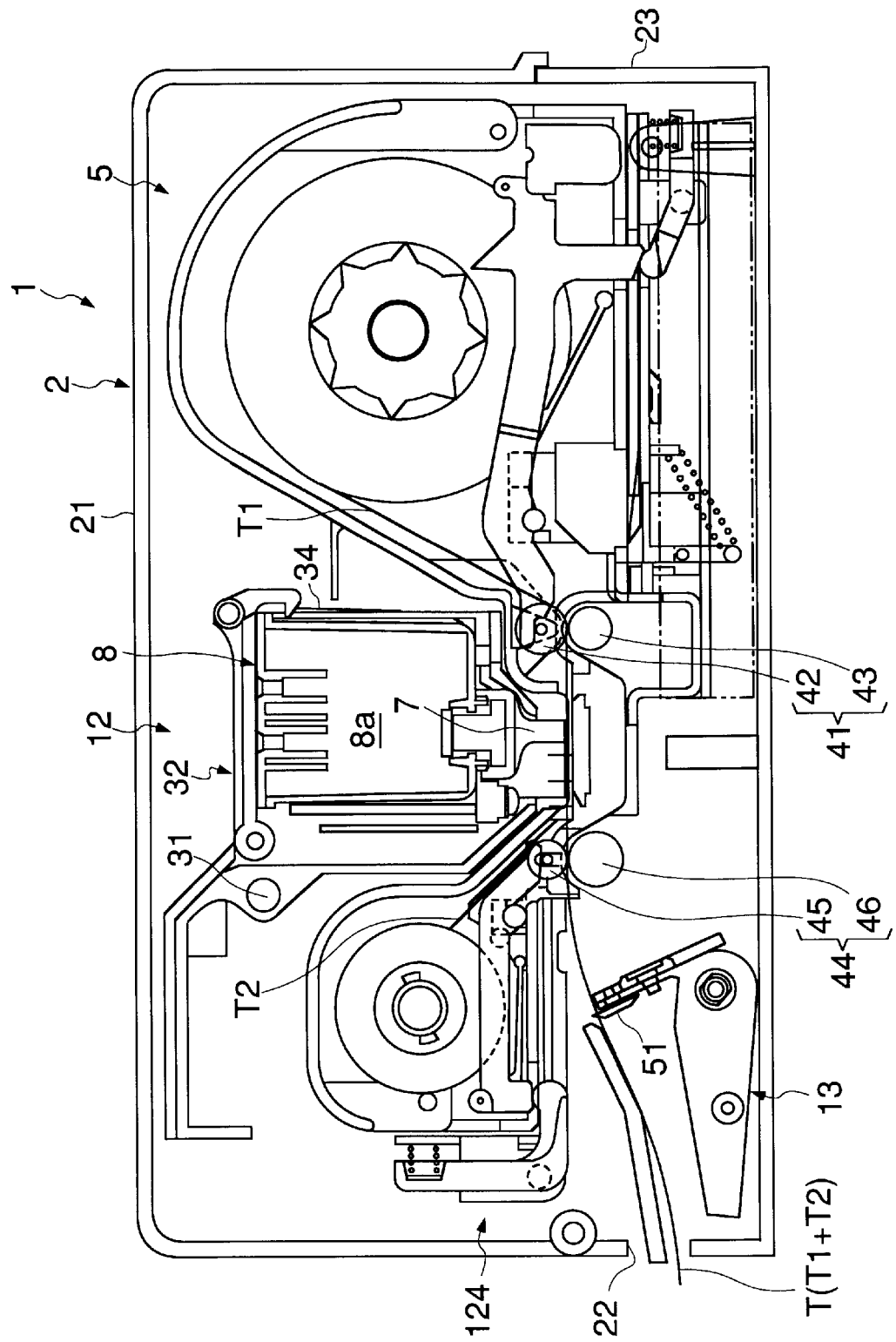
FIG. 3 is a cross-sectional view of a body of the FIG. 1 tape printing apparatus.

FIG. 3 shows the body 2 of the tape printing apparatus 1 in cross section. As shown in FIGS. 2 and 3, the printer block 12 includes a carriage guide shaft 31 having opposite ends thereof supported by a frame, not shown, a carriage 32 slidably mounted on the carriage guide shaft 31, a timing belt, not shown, traveling in normal and reverse directions for reciprocating the carriage 32 transversely to the direction of feed of the tape T (in the direction of the width of the tape T), a carriage motor (CR motor) 122 for causing the timing belt to travel in the normal and reverse directions, feed roller means 41 comprised of a feed driven roller 42 positioned above and a feed drive roller 43 positioned below, laminating roller means 44 comprised of a laminating driven roller 45 positioned above and a laminating drive roller 46 positioned below, a tape feed motor (TF motor) 121 for driving the feed drive roller 43 and the laminating drive roller 46 for rotation via a reduction gear train, not shown, a head cap mechanism, not shown, for closing in knozzles of the printhead 7 and cleaning the same by using a pump motor 123 as required, and an ejection mechanism 124 for setting and ejecting the tape cartridge 5.

The print head 7 for printing on the tape T and a cartridge holder 34 for holding the ink cartridge 8 that supplies ink are mounted at lower and upper portions of the carriage 32, respectively, in a manner forming a unit. The print head 7 faces downward, and the ink cartridge 8 is mounted within the cartridge holder 34 such that it has its delivery port directed downward. When the ink cartridge 8 is mounted, ink reservoirs 8a thereof, each of which contains ink of a different color, communicates with the print head 7 for supply of ink. The ink reservoirs 8a contain C (cyan) ink, M (magenta) ink, Y (yellow) ink, and K (black) ink, respectively.

Further, the carriage 32 has light shields, not shown, projecting therefrom. When one of the light shields is brought before an associated one of position-detecting sensors 142 each comprised of a photo interrupter or the like, the print head 7 is detected to be at a home position, not shown, whereby the correction of the position of the print head 7, such as zero position adjustment, is carried out. The home position serves not only as a standby position of the print head 7 but also as a reference position for printing. The CR motor 122 is driven for rotation in a predetermined number of steps from the reference position, whereby the carriage 32 is moved with accuracy to each position in the direction of the width of the tape T within a printing range, and the print head 7 is driven in synchronism with movement of the carriage 32 to thereby effect printing on a surface of the tape T in a desired manner.

Figure 4:
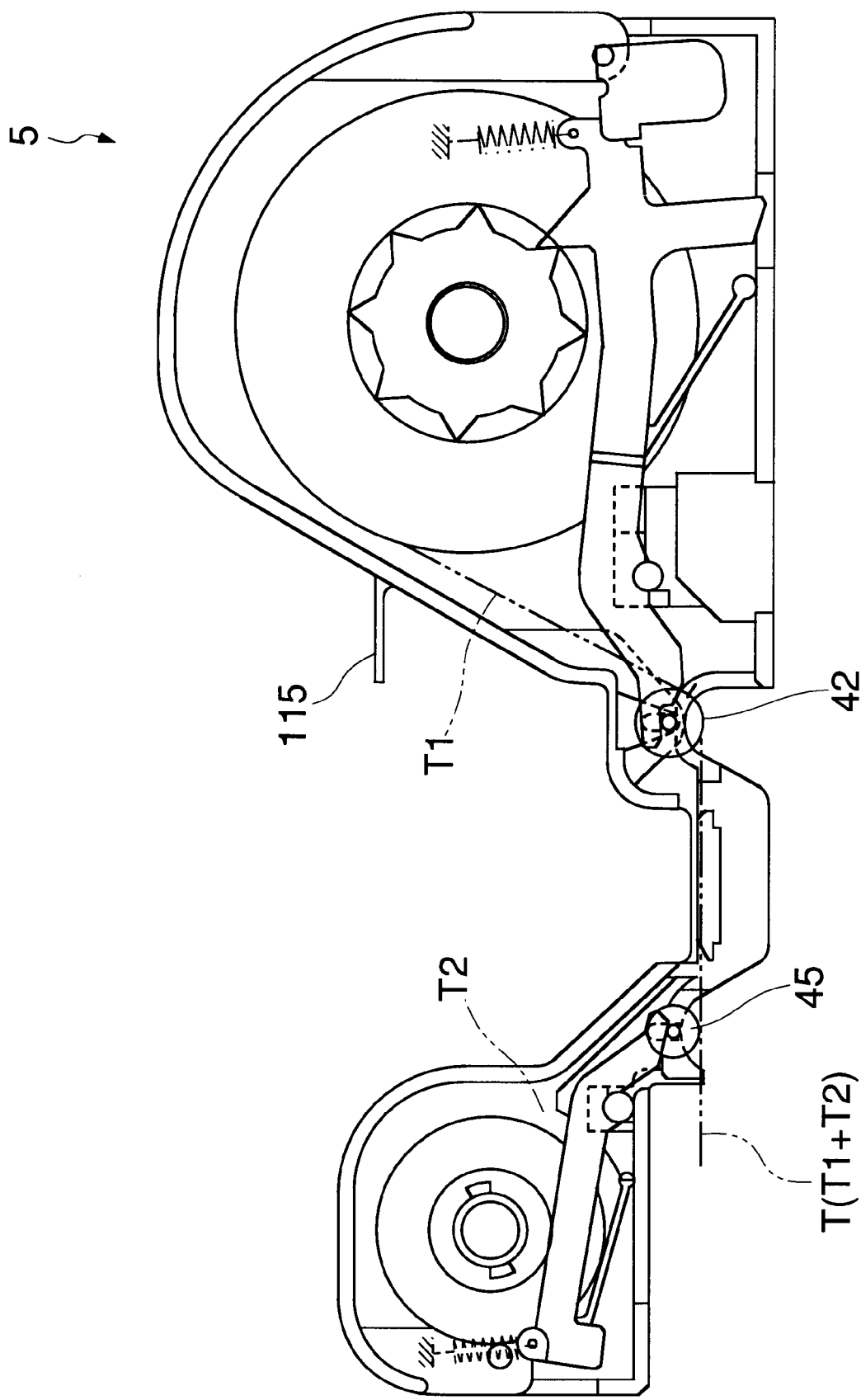
FIG. 4 is a cross-sectional view of a tape cartridge for being mounted in the FIG. 1 tape printing apparatus.

The tape cartridge 5 is provided with a discriminating plate 115 bearing discriminating information based on bit patterns or the like (see FIG. 4). A tape-discriminating sensor 141 mounted on the carriage 32 is brought to the discriminating plate 115 to thereby discriminate the type or kind of each of the tape cartridge 5, the printing tape T1 and the laminating tape T2 as well as detect a print-starting position for starting a printing operation on each printing tape Ti. Hereinafter, signals indicative of results of the sensing are referred to as "the tape-discriminating signals".

The feed drive roller 43 is arranged in the body 2 of the tape printing apparatus 1, while the feed driven roller 42 is arranged in the tape cartridge 5. When the tape cartridge 5 is mounted in the body 2, the feed driven roller 42 presses the printing tape T1 in a manner sandwiching the tape T1 between the feed drive roller 43 and the feed driven roller 42 itself. The printing tape T1 is advanced in this state as the TF motor 121 rotates.

The laminating drive roller 46 is arranged in the body 2, while the laminating driven roller 45 is arranged in the tape cartridge 5. When the tape cartridge 5 is mounted in the body 2, the laminating driven roller 45 presses the printing tape T1 and the laminating tape T2 in a manner sandwiching them between the laminating drive roller 46 and the laminating driven roller 45 itself. The printing tape T1 and the laminating tape T2 are advanced in this state while being affixed to each other as the TFmotor 121 rotates.

The cutter block 13 includes a cutter 51 and a cutter motor 131 for driving the cutter 51 for cutting operation. After printing is completed, the tape T (the printing tape T1+the laminating tape T2) is stopped when the TF motor 121 feeds the same further by a predetermined number of steps, and at the same time, the cutter motor 131 starts driving the cutter 51 for cutting the tape T. It should be noted that in the tape printing apparatus 1, a cutting key is provided so that the cutting operation can be manually carried out by key stroke, and it is possible to selectively set one of an automatic cutting mode and a manual cutting mode.

As shown in FIG. 2, the sensor block 14 is comprised of the tape-discriminating sensor 141 and the home position-detecting sensor 142. As described above, the tape-discriminating sensor 141 not only discriminates the type or kind of each of the tape cartridge 5, the printing tape T1, etc. but also detects the print-starting position for starting a printing operation on each printing tape T1, while the home position-detecting sensor 142 detects that the print head 7 is at its home position. The two sensors 141 and 142 deliver respective signals (tape-discriminating signal and position-detecting signal) to the control block 200. It should be noted that it is possible to provide other sensors as well, such as a voltage sensor to be connected to the power supply unit EU of the power supply block 290 supplying power to each of the electric and electronic components in the tape printing apparatus 1, for detecting changes in electric potential, an ambient temperature sensor, an ambient moisture sensor, ahead surface temperature sensor, and the like, according to actual requirements of the apparatus 1. Conversely, it is also possible to dispense with some of the sensors.

The driving block 270 includes a display driver 271, a head driver 272, and a motor driver 273. The display driver 271 drives the display 4 of the operating block 11 in response to control signals delivered from the control block 200, i.e. in accordance with commands carried by the signals. Similarly, the head driver 272 drives the print head 7 of the printer block 12 in accordance with commands from the control block 200. Further, the motor driver 273 has a TF motor driver 273a for driving the TF motor 121 of the printer block 12, a CR motor driver 273b for driving the CR motor 122, a pump motor driver 273c for driving the pump motor 123, and a cutter motor driver 273d for driving the cutter motor 131 of the cutter block 13, and similarly to the display driver 271 and the head driver 272, drives each motor in accordance with commands from the control block 200.

The operating block 11 includes the keyboard 3 and the display 4. The display 4 has a display screen 41 which is capable of displaying display image data of 96×64 dots on a rectangular display area of approximately 6 cm in the horizontal direction (X direction)×4 cm in the vertical direction (Y direction). The display 4 is used by the user to enter data via the keyboard 3 to form or edit matrix data indicative of a character string image having characters, such as letters, numerals, symbols, graphics and the like (represented by "letters" in the following description), arranged therein and a print image including the letter string image, view the resulting data, and enter various commands including ones for selecting menu options via the keyboard 3.

On the keyboard 3, there are arranged a letter key group 31 including an alphabet key group, not shown, a symbol key group, not shown, a number key group, not shown, and a nonstandard character key group, not shown, for calling nonstandard characters for selection, as well as a function key group 32 for designating various operation modes. In a type of the apparatus 1 which is capable of entering the Japanese language, there is also provided a kana key group, not shown, for entering Japanese hiragana letters and Japanese katakana letters.

The function key group 32 includes a power key, not shown, a print key, not shown, for instructing a printing operation, a form key, not shown, for displaying selection screens for switching between various operating modes, such as letter size-related modes, decorations-related modes, etc. as well as between various forms, a selection key, not shown, for finally determining entry of letter data and starting new lines during text entry as well as determining selection of one of the various operating modes on a corresponding one of the selection screens, a color specification key, not shown, for specifying printing colors including neutral colors (mixed colors) of print image data, a color-setting key, not shown, for setting colors of letters and background colors, and four cursor keys (up arrow key, down arrow key, left arrow key, and right arrow key), not shown, for moving the cursor or the display range of print image data on the display screen 41 in respective upward, downward, leftward, and rightward directions.

The function key group 32 also includes a cancel key, not shown, for canceling instructions, a shift key, not shown, for use in changing roles of respective keys as well as modifying registered image data, an image key, not shown, for alternately switching between a text entry screen or a selection screen and a display screen (image screen) for displaying print image data, a proportion-changing (zoom) key, not shown, for changing a proportion between the size of print image data and the size of display image data displayed on the image screen, and the cutting key for manually cutting the tape T. The function key group 32 further includes a bar code-setting key for preparing a bar code image described hereinafter and a bar code print key for forming and printing a bar code image.

Similarly to keyboards of the general type, the above key entries may be made by separate keys exclusively provided for respective key entries or by a smaller number of keys operated in combination with the shift key or the like. Here, for purposes of ease of understanding, the following description will be made assuming that there are provided as many keys as described above.

As shown in FIG. 2, from the keyboard 3, various commands described above and data are input to the control block 200.

The control block 200 includes a CPU 210, a ROM 220, a character generator ROM (hereinafter referred to as "the CG-ROM") 230, a RAM 240, and a peripheral control circuit (hereinafter referred to as "the P-CON") 250, all of which are connected to each other by an internal bus 260.

The ROM 220 includes a control program memory area 221 storing control programs executed by the CPU 210 and a control data memory area 222 storing control data containing a color conversion table, a letter modification table, a print control condition-setting table, dither matrices, predetermined basic (regular) dithermasks, a bar code print quality standard value table, a bar code pattern type table, an automatic bar color-setting table, a bar color conformity determination table, and so forth. In the type of the apparatus 1 which is capable of entering the Japanese language, there is also provided a kana-kanji conversion table for converting Japanese hiragana letters into corresponding Japanese kanji letters. The CG-ROM 230 stores font data of letters and the like provided for the tape printing apparatus 1, and outputs font data when corresponding code data identifying a letter or the like is given thereto.

The RAM 240 is supplied with backup power such that stored data items can be preserved even often the power is turned of f by operating the power key. The RAM 240 includes areas of a register group 241, a text data area 242 for storing text data of letters or the like entered by the user via the keyboard 3, a displayed image data area 243 for storing image data representative of an image displayed on the display screen 41, a print image data area 244 for storing print image data representative of a print image, a registered image data area 245 for storing registered image data items representative of registered images, a dither mask area 246 for storing a dither mask in use or after use, a color palette data area 247 for storing color palette information concerning printing colors and the like, and various buffer areas 248, such as a letter-forming buffer (font color buffer), a color conversion buffer, a basic color-by-basic color arrangement buffer, and a print buffer. The RAM 240 is used as work areas for carrying out the control process.

The P-CON 250 incorporates a logic circuit for complementing the functions of the CPU 210 as well as dealing with interface signals for interfacing between the CPU 210 and peripheral circuits. The logic circuit is implemented by a gate array, a custom LSI and the like. For instance, a timer (TIM) 251 is incorporated in the P-CON 250 for the function of measuring elapsed time. Accordingly, the P-CON 250 is connected to the sensors of the sensor block 14 and the keyboard 3, for receiving the above-mentioned signals generated by the sensor block 14 as well as commands and data entered via the keyboard 3, and inputting these to the internal bus 260 directly or after processing them. Further, the P-CON 250 cooperates with the CPU 210 to output data and control signals input to the internal bus 260 by the CPU 210 or the like, to the driving block 270 directly or after processing them.

The CPU 210 of the control block 200 receives the various signals/data items, etc. from the respective blocks within the tape printing apparatus 1 via the P-CON 250, according to the control program read from the ROM 220, processes font data from the CG-ROM 230 and various data stored in the RAM 240, and delivers various signals/data items, etc. to the respective blocks within the apparatus 1 via the P-CON 250, to thereby carry out position control during printing operations, display control of the display screen 41, and print control that causes the print head 7 to carry out printing on the tape T under predetermined printing conditions. In short, the CPU 210 controls the overall operation of the tape printing apparatus 1.

Next, the overall control process carried out by the tape printing apparatus 1 will be described with reference to FIG. 5. As shown in the figure, when a program for carrying out the control process is started, e.g. when the power of the tape printing apparatus 1 is turned on by operating the power key, first, at step S1, initialization of the system including restoration of saved control flags is carried out to restore the tape printing apparatus 1 to the state it was in before the power was turned of f the last time. Then, the image that was displayed on the display screen 41 before the power was turned off the last time is shown as an initial screen at step S2.

Figure 5:
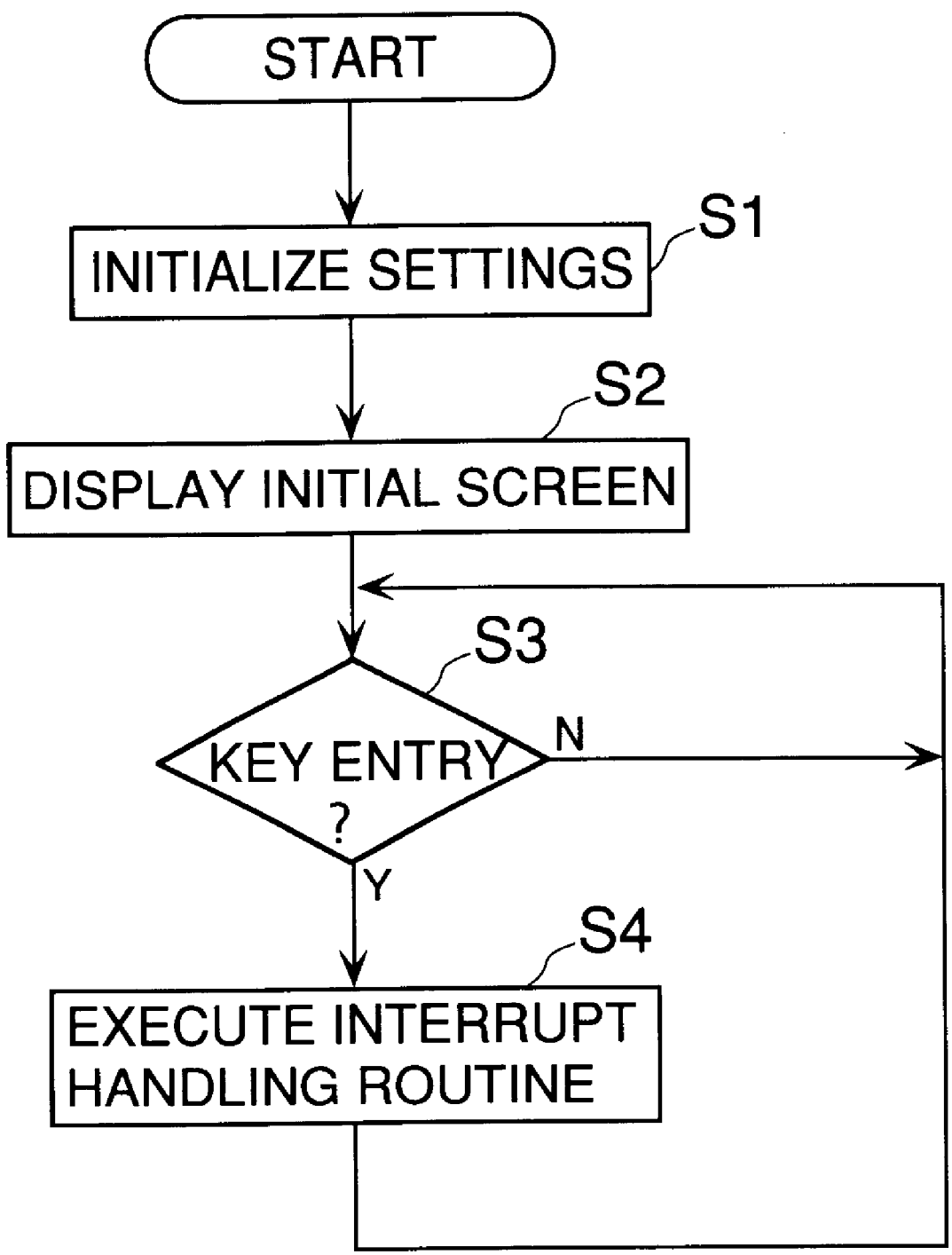
FIG. 5 is a flowchart showing a conceptual representation of an overall control process executed by the FIG. 1 tape printing apparatus.

The following steps in FIG. 5, that is, step S3 for determining whether or not a key entry has been made and step S4 for carrying out an interrupt handling routine are conceptual representations of actual operations. Actually, when the initial screen has been displayed at step S2, the tape printing apparatus 1 enables an interrupt by key entry (keyboard interrupt), and maintains the key entry wait state (No to S3) until a keyboard interrupt is generated. When the keyboard interrupt is generated (Yes to S3), a corresponding interrupt handling routine is executed at step S4, and after the interrupt handling routine is terminated, the key entry wait state is again enabled and maintained (No to S3).

As described above, in the tape printing apparatus 1, main processing operations by the apparatus are carried out by interrupt handling routines, and hence if print image data for printing is provided or has been prepared, the user can print the image data at a desired time, by depressing the print key to thereby generate an interrupt by the print key and start a printing process.

Figure 6:
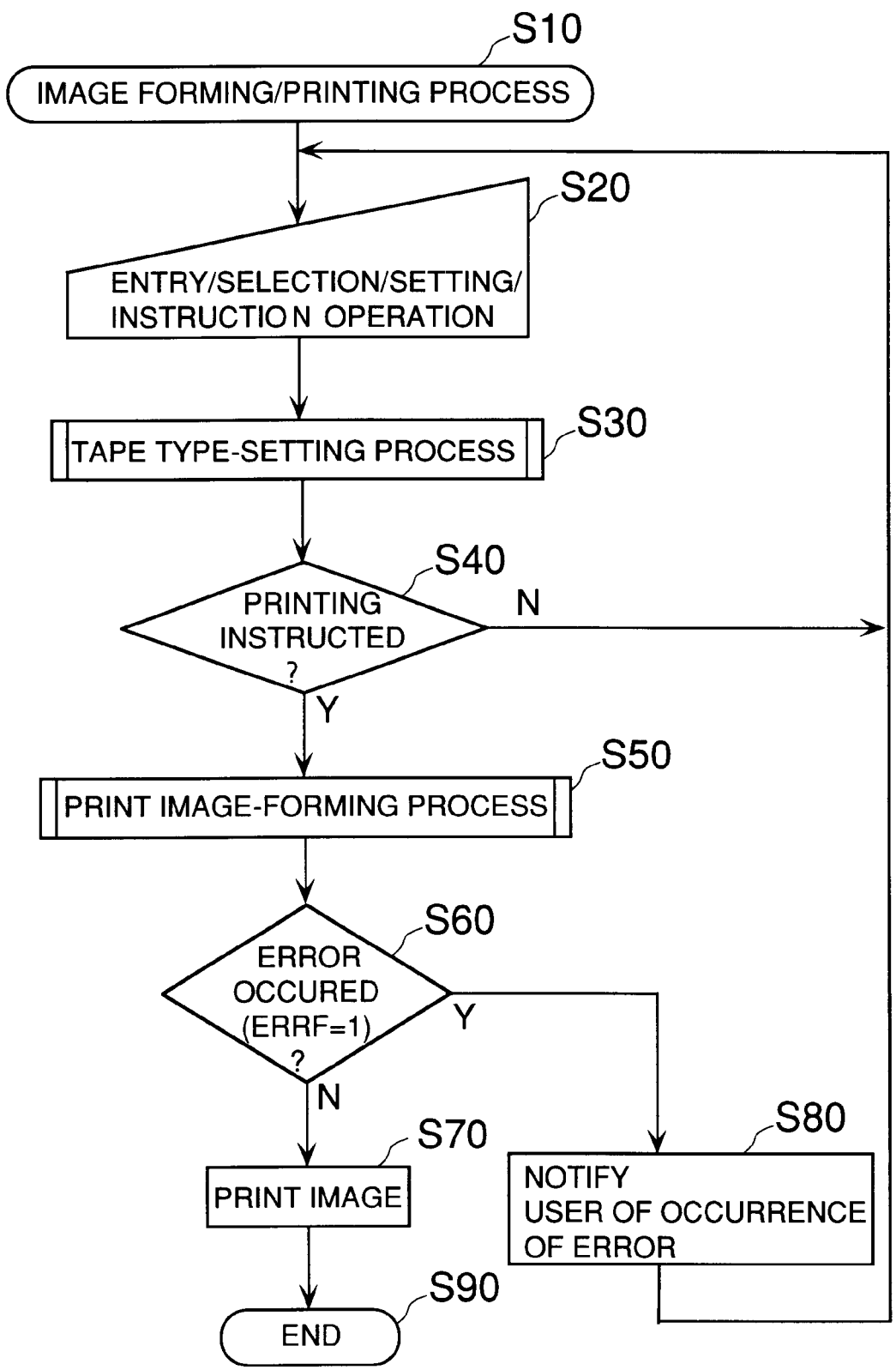
FIG. 6 is a flowchart showing an example of a typical image-forming/printing process.
Figure 7:
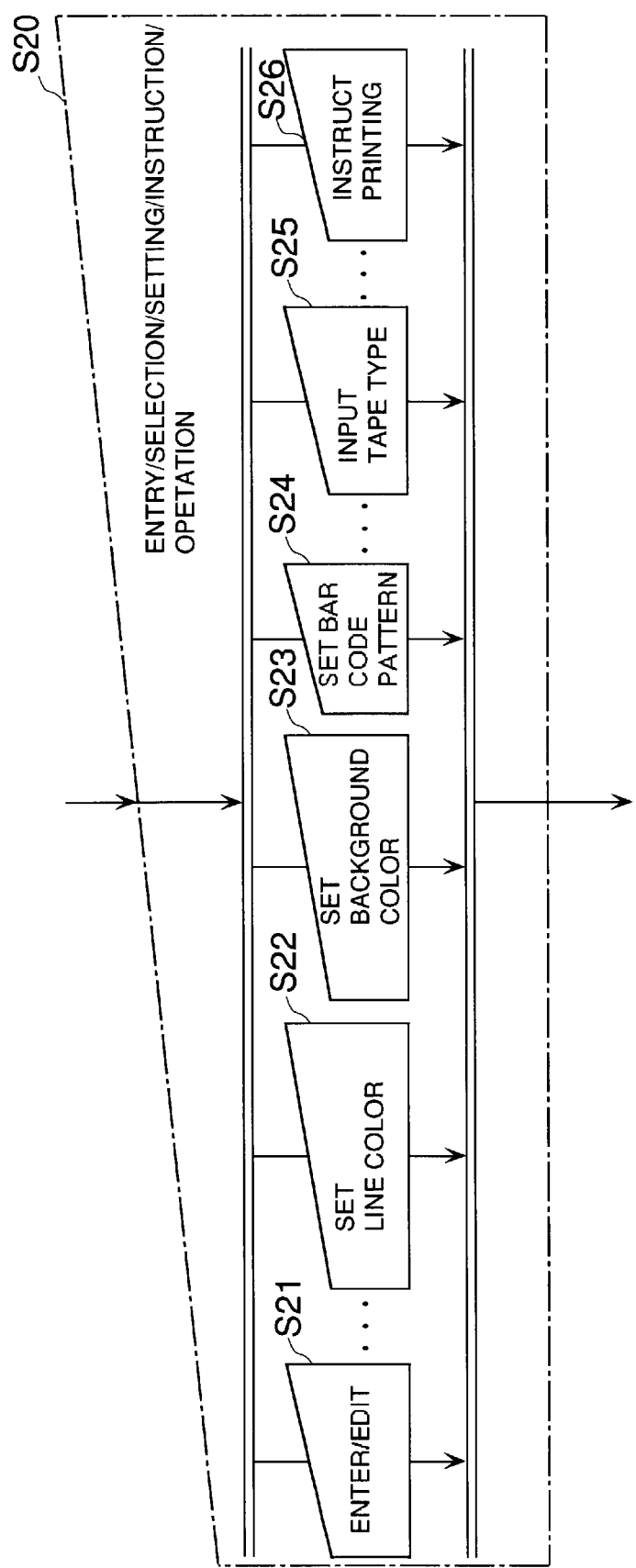
FIG. 7 is a flowchart showing an example of options for carrying out an entry/selection/setting/instruction operation in FIG. 6.

FIG. 6 is a flowchart showing a typical imageforming/printing process carried out by the tape printing apparatus 1. As shown in the figure, in this process (step S10), an entry/selection/setting/instruction operation is carried out at step S20. More specifically, as shown in FIG. 7, not only a letter entry/editing operation (S21) but also various entry/selection/setting/instruction operations can be carried out, thereby enabling the user to effect the operation as he desires by selecting options for carrying out the same.

For instance, when a print image of a letter string formed of general and desired letters is printed, the user enters a desired letter string while confirming or viewing the results of the entry on the display 4, at step S21. For example, letter strings "ABCDEF" and "GHIJKL" are entered on a first line and a second line, respectively, and then specification of a size and a decoration of the letters, not shown, is carried out, followed by effecting color specification, etc., not shown. To specify a size or a decoration, the form key is depressed to display a selection screen, and the cursor keys are operated in this state to highlight a desired one of options displayed on the screen. Then, the selection key is depressed to finally determine the desired size or decoration. On the other hand, to specify a color, gradation values or gray levels of C (cyan), M (magenta), and Y (yellow) are designated on the display screen 41 by operating the color specification key, based on color information defined by a preset color conversion table, and colors of letters and their background are specified and set by operating the color-setting key.

Further, as shown in FIG. 6, in parallel with (prior to or after) the entry/selection/setting/instruction operation (S20), a tape type-setting process described hereinafter is carried out at step S30. In this process, the type or kind of tape T can be automatically detected by the tape-discriminating sensor 141 described above with reference to FIG. 2, and also, as shown in FIG. 7, a desired type or kind can be manually entered by the user at step S25. That is, the form key is depressed to display a selection screen, and an option for setting the type of tape T, displayed on the selection screen, is highlighted for selection. Then, the selection key is depressed to finally determine the desired type or kind for designation. When the option for setting the type of tape T is selected, the screen is switched to a selection screen immediately under the option or at an immediately lower hierarchical level, which is used for setting the width of a tape T by selecting one from options classified according to the tape width or by directly inputting a numerical value of a tape width, or which is employed for selecting the material of the tape T from the options. Hence, the user highlights a desired one of the options by operating the cursor keys, and selecting the same by depressing the selecting key, or inputs a numerical value by using the number key group, whereby he can specify the type of tape T.

Figure 8:
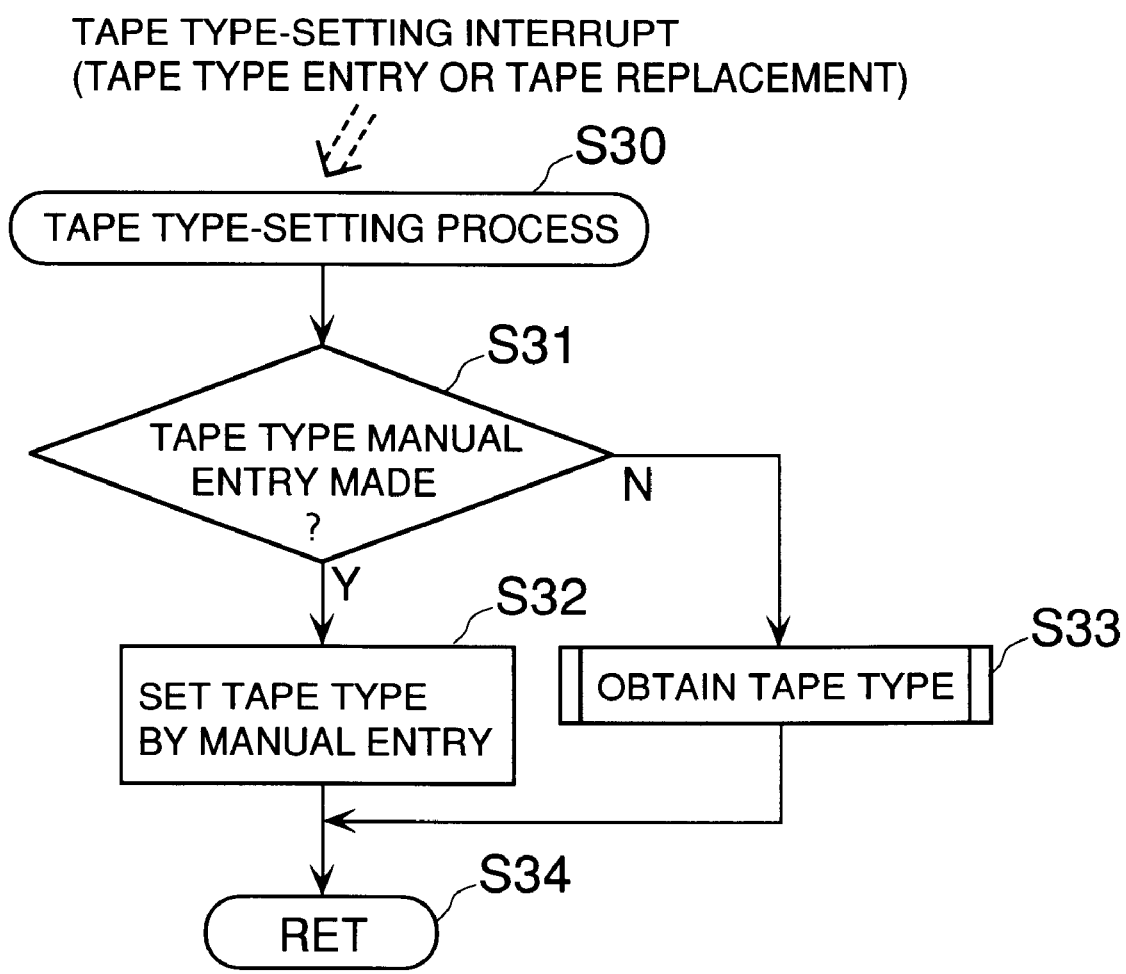
FIG. 8 is a flowchart showing an example of a tape type-setting process in FIG. 6.

More specifically, as shown in FIG. 8, when the type of tape T is manually entered (S25 in FIG. 7: hereinafter manual entry of the type of tape T is simply referred to as "the tape type entry") or replacement of tapes (replacement of tape cartridges 5) is carried out, a tape type-setting interrupt is generated to start the tape type-setting process (S30), in which first, it is determined at step S31 whether or not the tape type entry has been effected by the tape type-entering operation (S25). If the tape type entry has not been effected (No to S31), the type of type T is obtained from results of the automatic detection by the tape-discriminating sensor 141 (in response to a tape-discriminating signal therefrom) and set at step S33. If the tape type entry has been effected (Yes to S31), the type of tape T manually entered is set at step S32, followed by terminating the tape type-setting process (S30) at step S34.

When the tape type entry (S25) was carried out, it is required to cause a type of tape T automatically detected by the tape-discriminating sensor 141 from a tape cartridge 5 actually mounted and a type of tape T manually input to agree with each other, e.g. through replacement of tape cartridges 5 before a print instruction (S26) described hereinafter is given. When the types of tape T do not agree with each other until after a print instruction (S26) is given, an error is detected in the following print image-forming process (S50) to terminate the process (see steps S51 to S53 and step S59 in FIG. 10), since it is meaningless to print an image which does not match with the tape T. Then, since there has occurred an error (Yes to S60 in FIG. 6), the user is notified of the fact at step S80, followed by the program returning to the wait state for waiting for the entry/selection/setting/instruction operation (S20) or the tape type-setting process (S30) (No to S40).

Further, as shown in FIG. 7, the user can give any of various kinds of print instructions at a desired time at step S26, and the above wait state for waiting for the entry/selection/setting/instruction operation (S20) or the tape type-setting process (S30) is enabled and maintained (S20 to S40) until the user gives any print instruction (No to S40). When any print instruction is given in this state (Yes to S40), that is, when the user depresses the print key to thereby instruct a normal printing operation (S20 in FIG. 6, S26 in FIG. 7) (Yes to S40 in FIG. 6) after completing the entry of the above letter strings "ABCDEF" and the like (S20 in FIG. 6, S21 in FIG. 7), for instance, print image date representative of the print image is formed at step S50. A general type of image can be represented by image data e.g. of a binary matrix (dot matrix) composed of two-valued (binary) matrix elements, with "1" assigned to matrix elements corresponding to respective valid pixels which are to be printed and "0" assigned to matrix elements corresponding to respective invalid pixels which are not to be printed, and in the apparatus 1, actual image processing is performed on the image data. More specifically, a print image is realized only when it is printed based on corresponding print image data. In the following description, however, e.g. an expression "a print image is formed" is used for brevity in place of "print image data representative of a print image is formed". Thus, the print image is formed at step S50.

After termination of the print image-forming process (S50), it is determined (S60) whether or not an error has occurred (error representative flag ERRF=1). If it is detected that there has occurred an error (Yes to S60), a detailed error flag (an error notification A flag, described hereinbelow, or the like) is checked to notify the user of the fact (details of the error, etc.) (i.e. display an error message to notify the user of the fact on the display screen 41, in this example) at step S80, followed by returning again to the wait state for waiting for the entry/selection/setting/instruction operation (S20) or the tape type-setting process (S30) (No to S40). On the other hand, if it is detected that no error has occurred (error representative flag ERRF=0) (No to S60), next, the print image formed is printed at step S70. When a fixed length or the like is set, cutting operations for cutting the leading edge and the trailing edge of the print image are carried out to thereby form a desired label at the step S70, followed by terminating the image-forming/printing process (S10) at step S90.

In the tape printing apparatus 1, it is possible to form a print image not only from the letter string image of the above letter string "ABCDEF" but also from a bar code image. Therefore, in the following, description will be made of a case in which a bar code image is formed and printed as a print image. In this case, during the entry/selection/setting/ instruction operation (S20) described above with reference to FIG. 6, the letter entry/editing operation (S21) described above with reference to FIG. 7 is not carried out, but a bar code line color-setting operation (first bar color-setting operation: S22), a bar code background color-setting operation (second bar color-setting operation: S23), a bar code pattern-setting operation (S24) and the like, appearing in the figure, are carried out at the step S20.

In this case, by depressing the bar code-setting key, a selection screen (bar code-setting selection screen) for use in setting a bar code is displayed on the display screen 41 of the display 4, and by operating the cursor keys, a desired one of options of "LINE COLOR", "BG COLOR" (background color), "PATTERN" and the like can be highlighted, and selected by depressing the selection key. It should be noted that instead of displaying the bar code-setting selection screen by depressing the bar code-setting key and selecting a desired one from the options, separate dedicated keys, such as a bar code line color-setting key, a bar code background color-setting key, a bar code pattern-setting key and the like, may be provided for respective key entries such that any of the above respective operations (steps S22 to S24 in FIG. 7) can be directly started to directly display the following setting screens and selection screens in a manner switching from one screen to another.

For instance, when the option "LINE COLOR" is selected on the bar code-setting selection screen, in the tape printing apparatus 1, the program proceeds to the bar code line color-setting operation (S22), and the screen is switched to a selection screen for use in setting a line color of the bar code, which is hierarchically immediately under the option of "LINE COLOR". On this selection screen, various color names are displayed as options or candidates tobe selected for designating a line color (first bar color), and hence by operating the cursor keys to highlight a desired one of the options and depressing the selection key, the user can select the desired option. Similarly, when the option "BG COLOR" is selected, for instance, the program proceeds to the bar code background color-setting operation (S23), and the screen is switched to a selection screen for use in setting a background color of the bar code, as a selection screen hierarchically immediately under the option of "BG COLOR". On this selection screen, various color names are displayed as options or candidates to be selected for designating a background color (second bar color), so that by operating the cursor keys to highlight a desired one of the options and depressing the selection key, the user can select the desired option.

Figure 9:
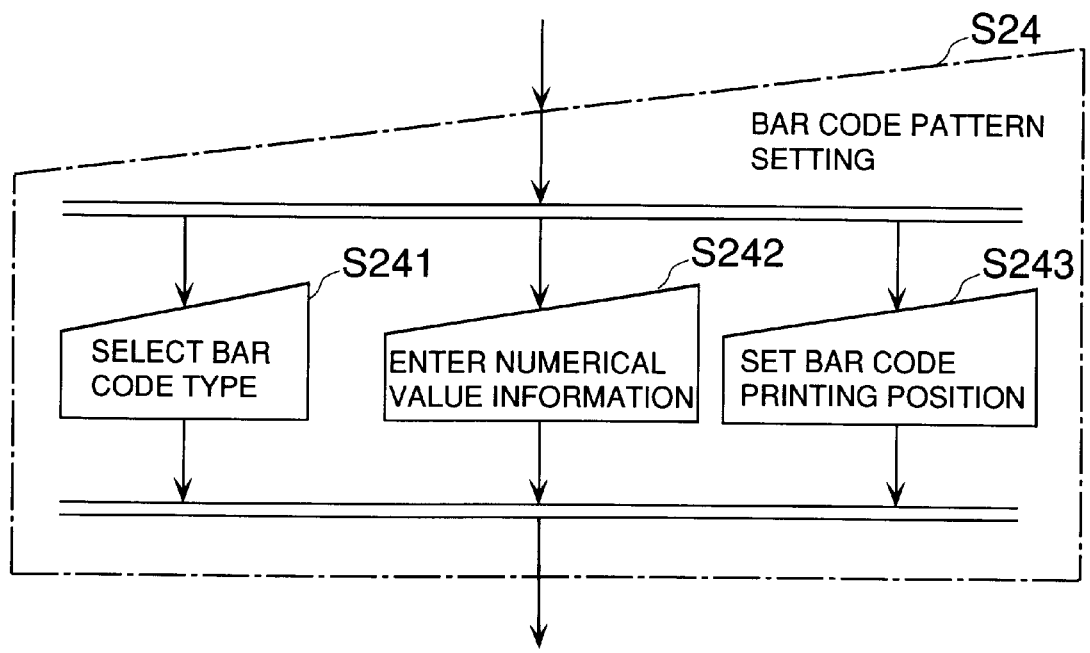
FIG. 9 is a flowchart showing an example of a bar code pattern-setting process in FIG. 7.

Further, for instance, when the option "PATTERN" is selected on the bar code-setting selection screen, in the tape printing apparatus 1, the program proceeds to the bar code pattern-setting operation (S24), and the screen is switched to a selection screen (bar code pattern-setting selection screen) for use in setting a bar code pattern, as a selection screen immediately under the option of "PATTERN". On this selection screen, various options, such as "TYPE", "NUMERICAL" (numerical value information), "POSITION" (printing position) and the like are displayed, so that the user can select one of FIG. 9 setting operations (S241 to S243) by operating the cursor keys to highlight a desired one of the options and depressing the selection key.

Now, for instance, the option "TYPE" is selected, the program proceeds to a bar code type-selecting operation (S241), and the screen is switched to a selection screen for use in setting the type of the bar code, which is hierarchically immediately under the option of "TYPE". On this selection screen, options for selecting a desired one of the types of bar codes processable by the tape printing apparatus 1 are displayed, so that if the user highlights a desired one of the options by operating the cursor keys and depressing the selection key, he can select the desired option. Further, for instance, when the option "NUMERICAL" is selected, the program proceeds to a bar code numerical value information entry operation (S242), and the screen is switched to an entry screen for entering numerical value information of a desired bar code. On this entry screen, similarly to the case of the letter entry/editing operation (S21 in FIG. 7), letters (including alphabets, numerals, symbols, etc.) represented by bar codes can be input by operating the letter key group 31. The entered letters can be finally determined by depressing the selection key. Information of the letters input as text data is reflected on bar codes (images) as binary information formed of predetermined two values (0 and 1 in this embodiment) representative of the letters.

In the tape printing apparatus 1, options, such as "JAN-8", "JAN-13", "ITF" (INTERLEAVED 2 OF 5), "NW-7" (CODABAR), "CODE39", "UPC-A", "UPC-E", "CODE 2 OF 5", "CODE11", "CODE93", "CODE128" and the like, are displayed on the above selection screen for setting a bar code type, and hence the user can highlight a desired one of the options by operating the cursor keys and select the same by depressing the selection key.

Figure 19A:
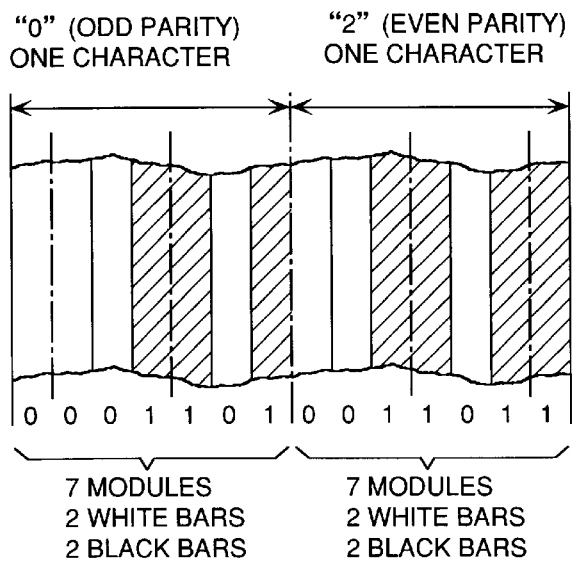
FIG. 19A is a table showing numerical value information and binary digits based on the standard of "JAN" or "UPC"
Figure 20A:
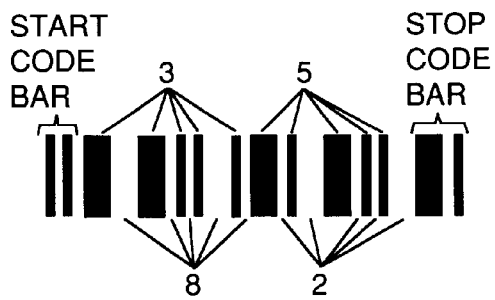
FIG. 20A is a table showing numerical value information and binary digits based on the standard of "ITF"

For instance, in the case of the bar code types "JAN" ("JAN-8", "JAN-13") and "UPC" ("UPC-A", "UPC-E") among the types of bar codes illustrated in FIG. 18, numerical value information (decimal number: codes) thereof is represented in binary form as shown in FIG. 19A in which a black bar and a white bar each having a predetermined width represent numerical values "1" and "0", respectively, whereby a bar code pattern corresponding to the numerical value information is formed, as shown in FIG. 19B. Further, as shown in FIGS. 20A and 20B, in the case of the bar code type "ITF", numerical value information (codes) thereof is represented in binary form, in which a thick bar and a thin bar represent numerical values "1" and "0", respectively. In this case, odd-numbered numerical values of the numerical value information are represented by black bars (black and thick bars and black and thin bars) and even numbered numerical values of the same are represented by white bars (white and thick bars and white and thin bars) which are alternately laid out, thereby forming a bar code pattern corresponding to the numerical value information.

Referring to FIG. 21, in the case of the bar code type "NW-7", numerical value information (characters: codes) thereof is represented in binary form, in which thick bars representing "1+ and thin bars representing "0" are disposed alternately to form a bar code pattern corresponding to the information. As shown in FIGS. 22 and 23, in the case of the bar code type "CODE39" as well, which is basically similar to the bar code type "NW-7", numerical value information (characters: codes) thereof is represented in binary form, and thick bars representing "1" and thin bars representing +0" are disposed alternately, thereby forming a bar code pattern corresponding to the numerical value information.

Figures 28A, 28B, 28C:
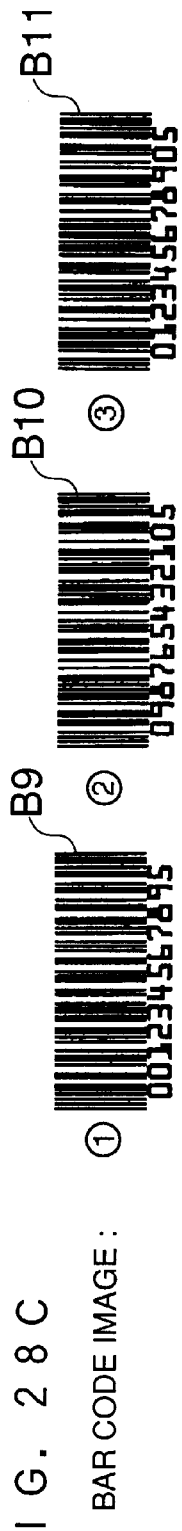
FIGS. 28A to 28C are diagrams similar to FIGS. 24A to 24C, respectively, which are useful in explaining the standard of "ITF"
Figures 29A, 29B, 29C:
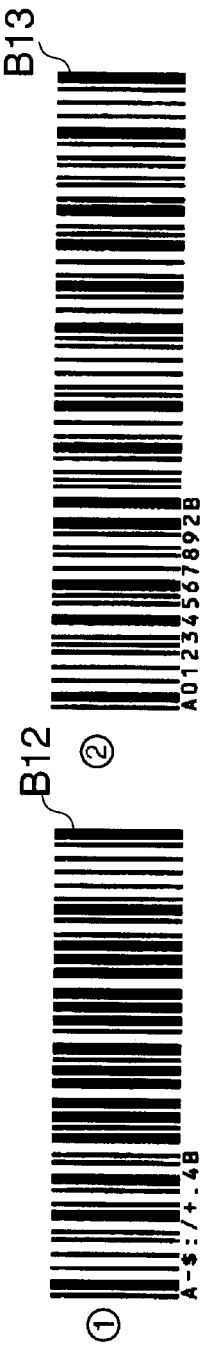
FIGS. 29A to 29C are diagrams similar to FIGS. 24A to 24C, respectively, which are useful in explaining the standard of "NW-7"

FIG. 24A shows the relationship between numerical value information and a bar code pattern formed based on the standard of "JAN-8". According to this standard, characters (bar code characters) lef tward of a center bar are necessarily of odd parity, whereas characters (bar cod characters) rightward of the same are necessarily of even parity. FIG. 25A shows the relationship between numerical value information and a bar code pattern formed based on the standard of "JAN-13". According to this standard, characters leftward of a center bar are of odd parity and of even parity, whereas characters rightward of the same are necessarily of even parity. A flag character, not shown, is not represented by bars, but by a combination of parities. (In the illustrated example, odd, even, odd, odd, even, and even parities are arranged from left. This combination represents "4".) FIG. 26A shows the relationship between numerical value information and a bar code pattern formed basedonthestandardof "UPC-A". According to this standard, characters leftward of a center bar are necessarily of odd parity, whereas characters rightward of the same are necessarily of even parity. FIG. 27A shows the relationship between numerical value information and a bar code pattern formed based on the standard of "UPC-E". According to this standard, both odd and even parities necessarily exist in the pattern. Although a check digit exists, it is not represented by a bar or bars but by a combination of parities. FIG. 28A shows the relationship between numerical value information and a bar code pattern formed based on the standard of "ITF". According to this standard, one character is comprised of three thin bars and two thick bars, five in total. Each character is comprised of five black bars alone or five white bars alone, and elements of characters extend sequentially into the inside of characters adjacent thereto. The number of the characters is necessarily an even number. FIG. 29A shows the relationship between numerical value information and a bar code pattern formed based on the standard of "NW-7". According to this standard, two kinds of characters are provided. One is comprised of five thin bars and two thick bars, seven in total, and the other is comprised of four thin bars and three thick bars, seven in total. Space portions serve as white bars for signification. Character gaps are required. FIG. 30A shows the relationship between numerical value information and a bar code pattern formed based on the standard of "CODE39". According to this standard, one character is comprised of six thin bars and three thick bars, nine in total. Space portions also serve as white bars for signification. Character gaps are required.

The bar codes of the above-mentioned types (standards or symbologies) define bar code patterns as described above, and the information thereof is stored in the ROM 220 or the like, so that e.g. when "numerical value information" as shown in FIGS. 24B, 25B, 26B, 27B, 28B, 29B and 30B is input, the patterns of bar code images appearing in FIGS. 24C, 25C, 26C, 27C, 28C, 29C and 30C are obtained.

Now, when a printing position, described hereinafter, for printing a bar code is simply set to a location backward i.e. rightward, as viewed in the figure, of a letter string provided at that time (i.e. to an option "WHOLE RIGHT", referred to hereinafter), as shown in FIGS. 31A to 34E, for instance, it is possible to print a bar code image backward i.e. rightward, as viewed in the figure, of the image of each letter string (letter string of the name of a standard or a bar code type is illustrated) and produce desired labels Q1 to Q16 through cutting operations. It should be noted that in the examples, bar code images B1 to B16 printed in FIGS. 31A to 34E are the same bar code images B1 to B16 shown in FIGS. 24C to 30C, and that the images include check digits (CD's) at end portions of numerical values thereof. Further, in the tape printing apparatus 1, the size of a bar code (image) in the direction of the width thereof (i.e. the length of each bar thereof ) can be selected from options "SMALLER", "REGULAR", "LARGER" and the like on a selection screen (screen to which the screen is switched after selection of a desired bar code type) which is hierarchically immediately under the menu of bar code types, and in a bar code type using thin and thick bars, it is possible to select the ratio of values of thickness of the bars from a plurality of options in a range of "2.2" to "3.0". Further, in the bar code types "UPC" and "JAN", check digits (CD's) are automatically added, whereas in other bar code types, it is possible to select whether or not a check digit (CD) is added.

As described above, in the tape printing apparatus 1, a plurality of bar code types, whose methods of arranging two kinds of bars therein are different from each other, are defined, and a desired one is selected from the plurality of bar code types, whereby a method of arranging bar codes can be set simply by selecting a bar code type, which makes it possible to easily set the arrangement of the two kinds of bars according to the method selected. Further, for a bar code which represents numerical value information by two kinds of bars set or determined as one and the other of predetermined two numerical values, the user is only required to input the numerical value information, thereby making it possible to easily form a bar code pattern by entry of the numerical value information. The predetermined two values are 0 and 1, that is, numerical value information is represented in binary form, and by entering desired numerical value information, it is possible to arrange one of the two kinds of bars at positions corresponding to 0 and the other of the two kinds of bars at positions corresponding to 1, thereby easily setting or forming a bar code pattern.

On the other hand, when the option of "POSITION", for instance, is selected on the bar code pattern-setting selection screen described above with reference to FIG. 9, the program proceeds to a process (S243) for setting a bar code printing position, and the screen is switched to a selection screen for setting a bar code printing position, which is hierarchically immediately under the option of "POSITION". On this selection screen, there are displayed options for selecting a printing position of a bar code image on a label, such as "WHOLE RIGHT", "TOP RIGHT", "MIDDLE RIGHT", "BOTTOM RIGHT", "WHOLE CENTER", "TOP CENTER", "MIDDLE CENTER", "BOTTOM CENTER", "WHOLE LEFT", "TOP LEFT", "MIDDLE LEFT", "BOTTOM LEFT", "WHOLE", "ARBITRARY" and the like. Hence, the user can highlight a desired one of the options by operating the cursor keys and select the desired option by depressing the selection key.

Figure 36:
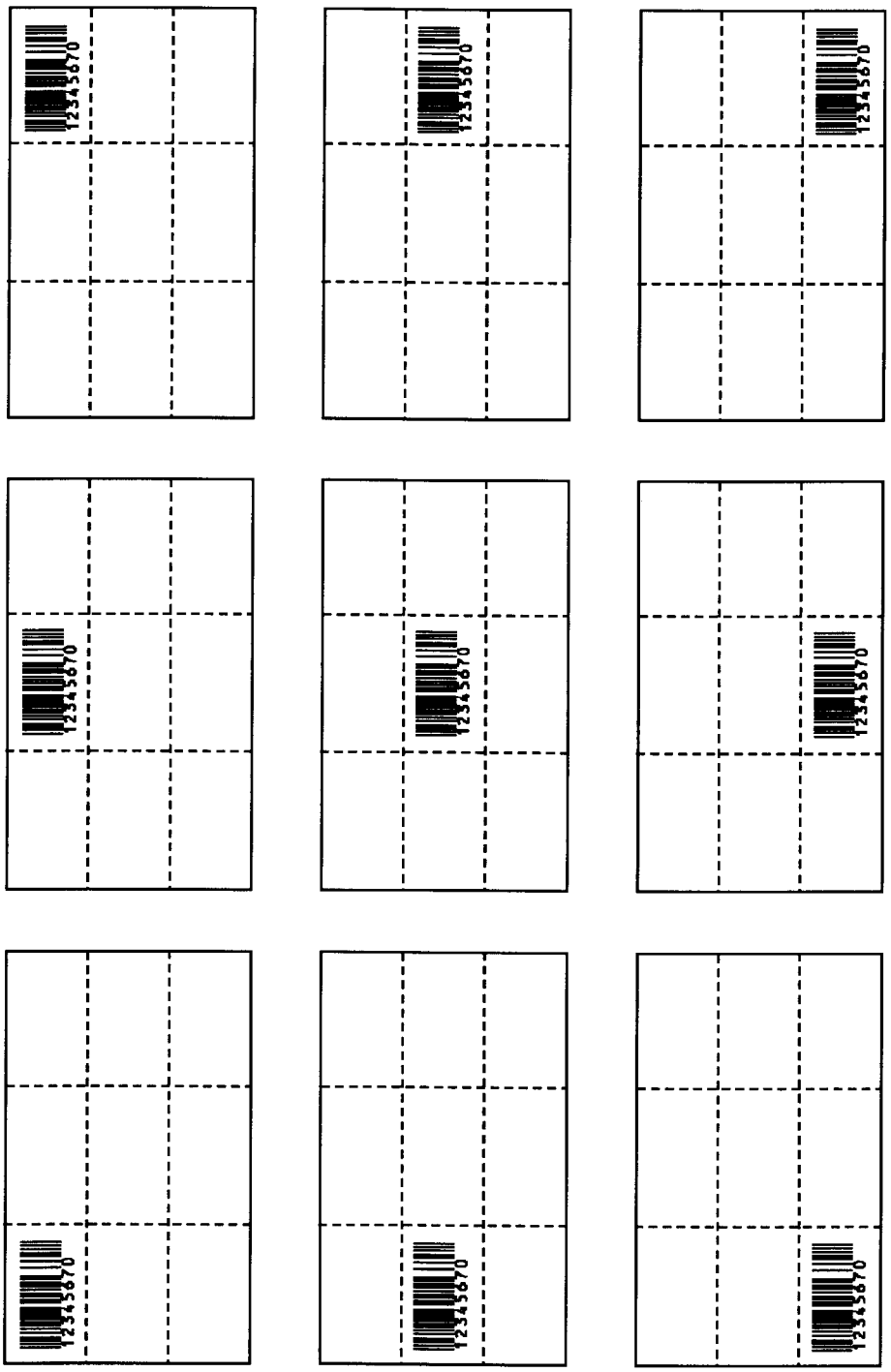
FIG. 36 is a diagram illustrating printing positions, which are useful in explaining examples of printing positions designated by selecting respective options of the printing position.
Figure 37:
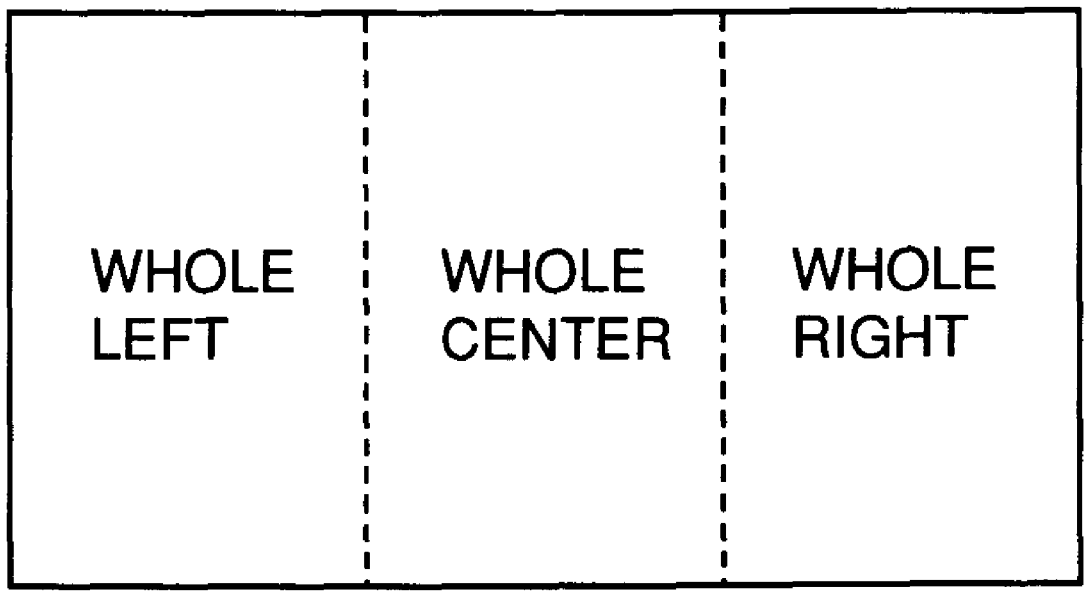
FIG. 37 is a diagram similar to FIG. 35, which shows another example of the relationship between examples of the menu options of the printing position and printing positions designated by selecting ones respective the options.
Figure 39A:
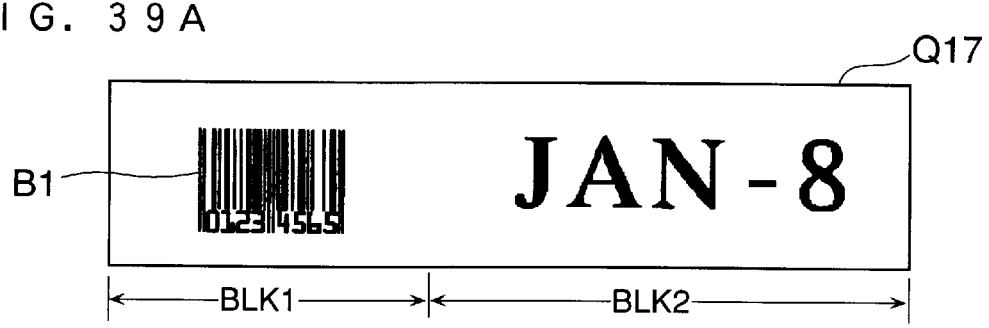
FIGS. 39A to 39B are diagrams showing examples of results of printing operations for printing bar code images when printing positions different from positions appearing in FIGS. 31A to 31D and FIG. 45 are designated, and labels produced by the printing operations.
Figure 39B:
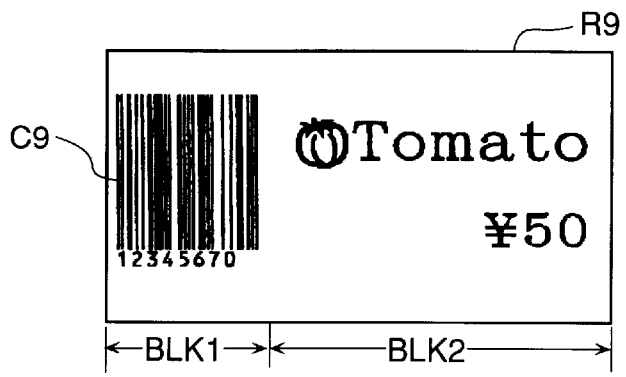

The options "TOP RIGHT", "MIDDLE RIGHT", "BOTTOM RIGHT", "TOP CENTER", "MIDDLE CENTER", "BOTTOMCENTER", "TOP LEFT", "MIDDLE LEFT", and "BOTTOM LEFT" basically indicate printing areas (printing positions) shown in FIG. 35, and bar codes are printed at respective printing positions shown in FIG. 36, for instance. Further, the options "WHOLE RIGHT", "WHOLE CENTER" and "WHOLE LEFT" basically indicate respective printing positions shown in FIG. 37, and bar codes are printed at respective positions shown in FIGS. 38A to 38C. When a plurality of paragraphs (blocks) are set in the direction of the length of the tape T, the option "WHOLE RIGHT" indicates that the bar code printing position is set to the whole of a last paragraph (block), as shown by the labels Q1 to Q16 in FIGS. 31A to 34E and a label R8, described hereinafter with reference to FIG. 45, while the option "WHOLE LEFT" indicates, as shown in FIGS. 39A and 39B, that the bar code printing position is set to a first paragraph BLK1. Further, the option "WHOLE CENTER" indicates, for instance, a second paragraph BLK2 in the case of two paragraphs being arranged in the direction of the length of the tape T (the same as "WHOLE RIGHT", in this example), a second paragraph BLK2 (i.e. central paragraph) in the case of three paragraphs being arranged in the direction of the length of the tape T, a second paragraph BLK2 in the case of four paragraphs being arranged in the direction of the length of the tape T, a third paragraph BLK3 in the case of five paragraphs being arranged in the direction of the length of the tape T, a third paragraph BLK3 in the case of six paragraphs being arranged in the direction of the length of the tape T, and the like. Further, the option "WHOLE" literally indicates a whole area of a label.

The tape printing apparatus 1 is provided with the option "ARBITRARY" which is a special option for indicating a printing position. When the this option is selected, the screen is switched from the selection screen for setting a bar code printing position to a screen (hereinafter referred to as "the text-editing screen") for use in the letter entry/editing operation (S21) described above with reference to FIG. 7, and a bar code mark is displayed at a position where the cursor K is place at this time. That is, when the option "ARBITRARY" is selected, it becomes possible to specify a printing position by employing the bar code mark, which will be described hereinafter.

Figures 40A, 40B:
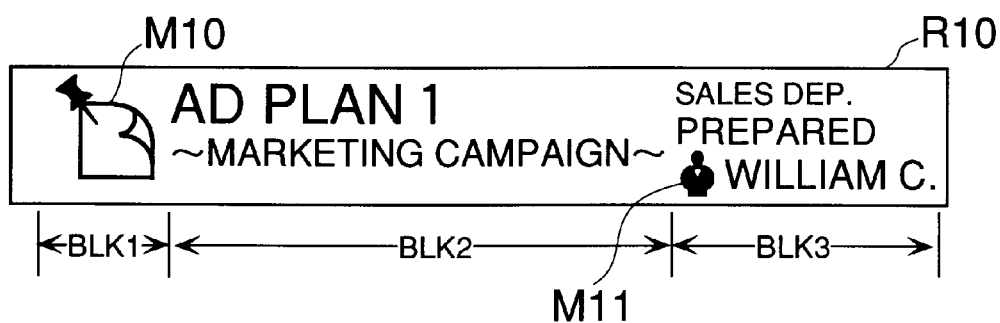
FIG. 40A is a diagram which is useful in explaining an example of a label printed with normal letter string images.
FIG. 40B is a diagram which is useful in explaining an example of a text edit screen for use in printing normal letter string images.

Now, when a label having a normal letter string image printed thereon is formed, e.g. when a label R10 shown in FIG. 40A is formed, (a display image corresponding to) text data is displayed on the display screen 41 of the display 4, as shown in FIG. 40B, so that the user can input and edit a letter string image on the text-editing screen displayed in the display screen 41. In this embodiment, a graphic (ad mark) M10 indicating advertisement or a graphic (human mark) M11 indicating a human being is also handled as an ordinary letter. In the case of this example, only one line formed of only the ad mark M10 is input as text data as a source of an image printed in a first paragraph BLK1. Further, a second paragraph BLK2 has a letter string "AD PLAN 1" entered on a first line and letter strings "~MARKETING CAMPAIGN~" on a second line. A third paragraph BLK3 has letter strings "SALES DEP." input on a first line, a letter string "PREPARED" on a second line, letter strings "WILLIAM C." in a manner continuous with the human mark M11 on a third line.

Further, for instance, when a label R20 shown in FIG. 41A is produced, as shown in FIG. 41B, a letter string "EXTENSION" is input in a manner continuous with a telephone mark M21 on a first line of a first paragraph BLK1, and the selection key is depressed to start anew line. Then, letter strings "SALES DEP." are entered on a second line, and when a paragraph break insertion key is depressed (the selection key+the shift key are depressed in this embodiment) in the state of the cursor K being placed backward of the letter strings "SALES DEP.", that is, at a cursor position K1 shown in the figure, then the cursor K is displayed at a cursor position K2, to thereby prompt the user to enter a letter string on a first line of a next paragraph (second paragraph BLK2). In response to the prompt, letter strings "DIV.1: 131", "DIV.2: 132" and "DIV.3: 133" are entered on the first line, a (newly started) second line and a (newly started) third line, respectively, in the second paragraph BLK2, and then, when the paragraph break insertion key is depressed again, the cursor K is displayed to thereby prompt the user to enter a letter string on a first line of a next paragraph (third paragraph BLK3). When the print key is depressed in this state, the letter strings are printed as shown in FIG. 41A, thereby making it possible to form the label R20 having the letter strings printed thereon.

Figures 42A, 42B:
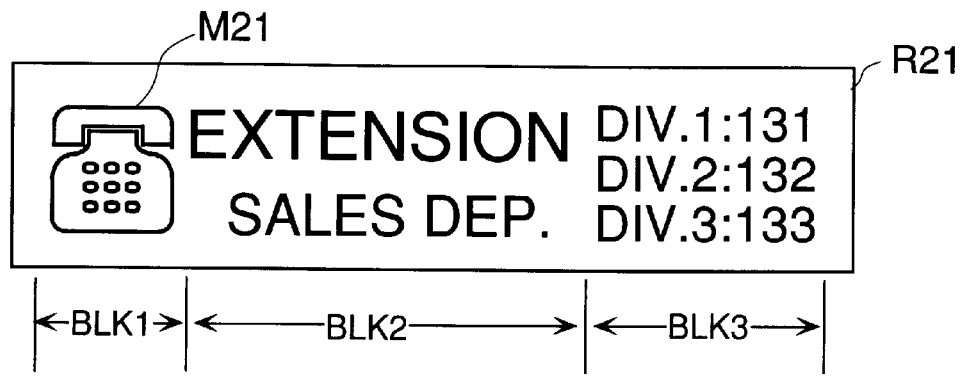
FIGS. 42A to 42B are diagrams similar to FIGS. 40A to 40B and continued form FIGS. 41A to 41B, which includes an example of text data entered to provide still another paragraph.
Figure 43A:
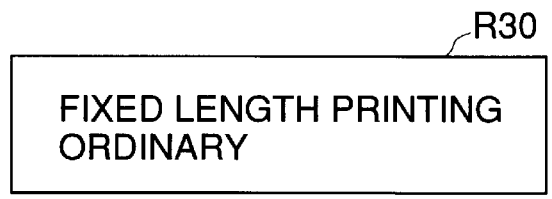
FIGS. 43A to 43E are diagrams which are useful in explaining examples of labels which are printed with normal letter string images subjected to various types of layout processing.
Figure 43B:
Figure 43C:
Figure 43D:
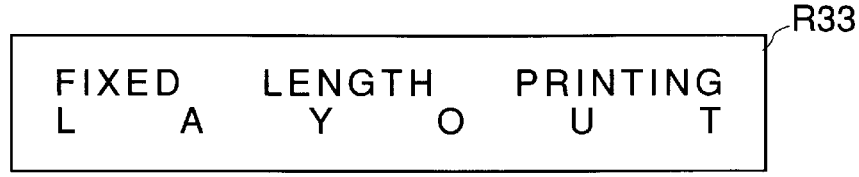
Figure 43E:

Further, when the cursor keys are operated from the above state and, as shown in FIG. 42B, the paragraph break insertion key is depressed in the state of the cursor K being placed backward of the telephone mark M21, that is, at a cursor position K1 shown in the figure, the cursor K is displayed at a cursor position K2. Then, contents after the cursor position K2, that is, the letter strings "EXTENSION" and "SALES DEP." are moved into the second paragraph BLK2, and the letter strings "DIV. 1: 131" and the following ones, that is, original contents in the second paragraph BLK2 are moved into the third paragraph BLK3, thereby newly producing the first paragraph BLK1 formed of only the telephone mark M21. When the print key is depressed in this state, the letter strings are printed as shown in FIG. 42A, thereby making it possible to form the label R21 having the letter strings printed thereon.

As is known in the art, in the case of a normal letter string image, it is possible to carry out various types of layout processing on the same. That is, various types of layout can be specified, whereby, for instance, as shown in FIGS. 43A to 43E, it is possible not only to form a label R30 printed by arbitrary length printing but also to form labels printed by fixed length printing based on a designated layout method, such as "forward alignment" (also called "left alignment" or "line head alignment") for printing a label R31, "center alignment" (also called "centering") for printing a label R32, "uniform layout" (also called "inter-letter alignment" or "inter-letter uniform layout) for printing a label R33, "backward alignment" (also called "reward alignment", "right alignment" or "line end alignment") for printing a label R34, and the like.

Figure 31A:
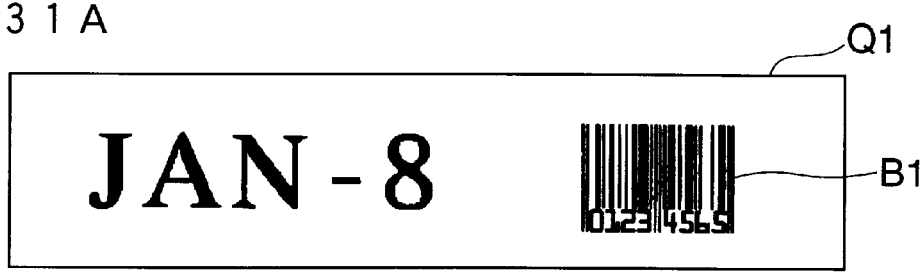
FIGS. 31A to 31D are diagrams showing examples of results of printing of bar code images formed based on the standards of "JAN-8" and "JAN-13", and labels produced by the printing operations.
Figure 31B:
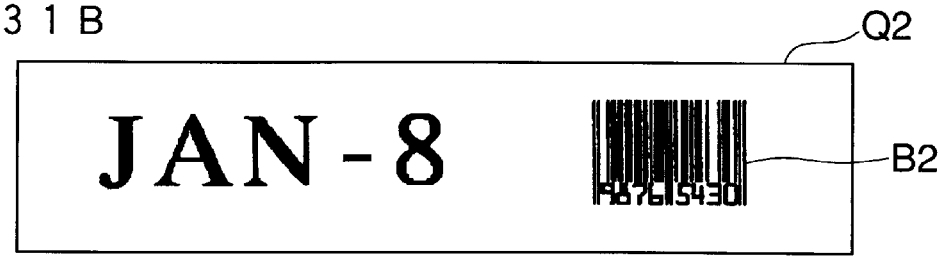
Figure 31C:
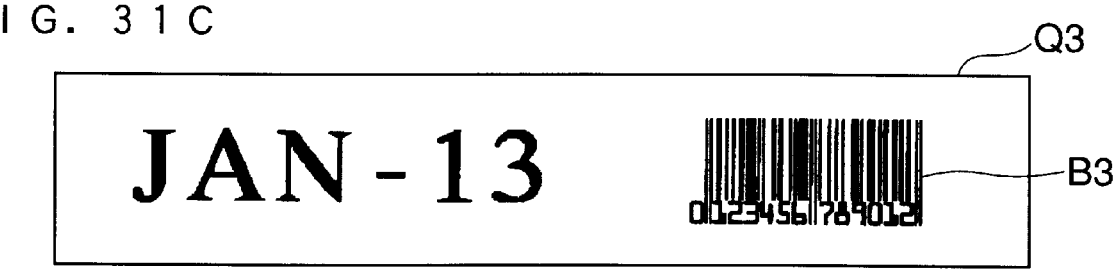
Figure 31D:
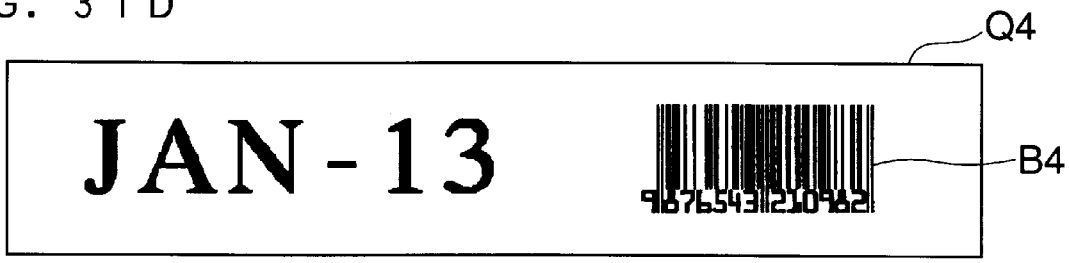
Figure 32A:
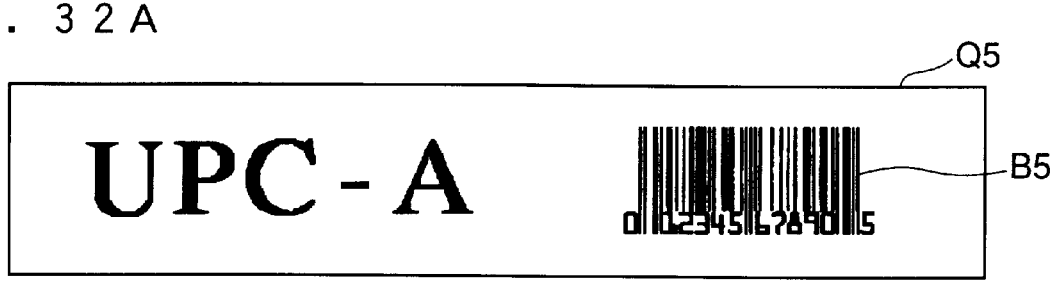
FIGS. 32A to 32D are diagrams similar to FIGS. 31A to 31D, in which bar code images are formed based on the standards of "UPC-A" and "UPC-E"
Figure 32B:
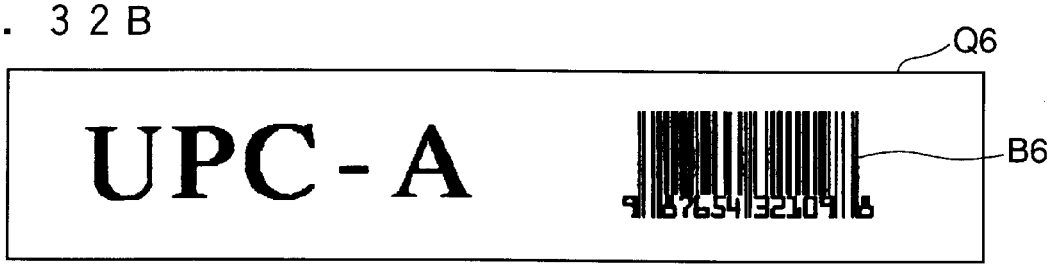
Figure 32C:
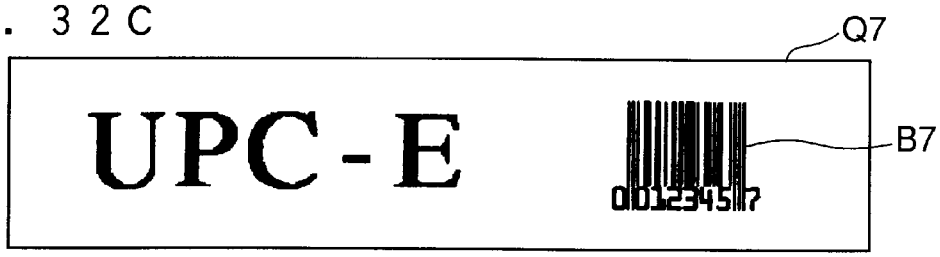
Figure 32D:
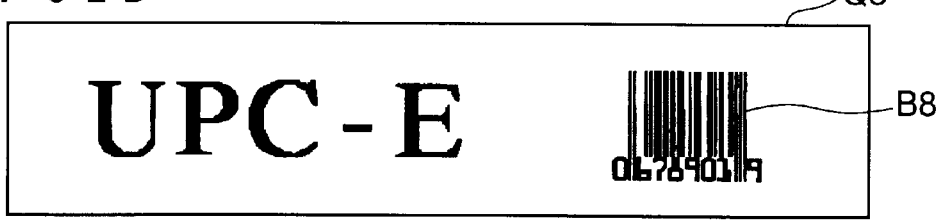
Figure 34A:
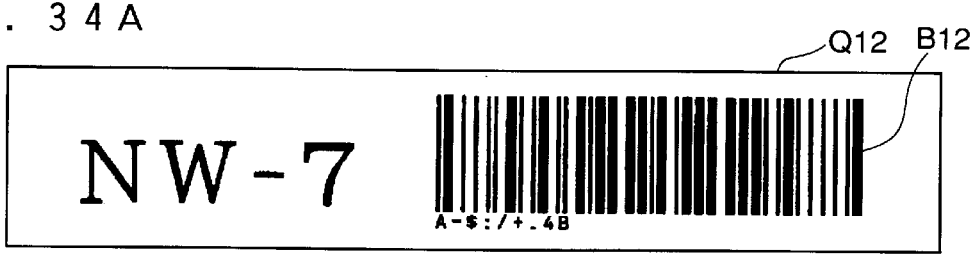
FIGS. 34A to 34E are diagrams similar to FIGS. 31A to 31D, in which bar code images are formed based on the standards of "NW-7" and "CODE39"
Figure 34B:
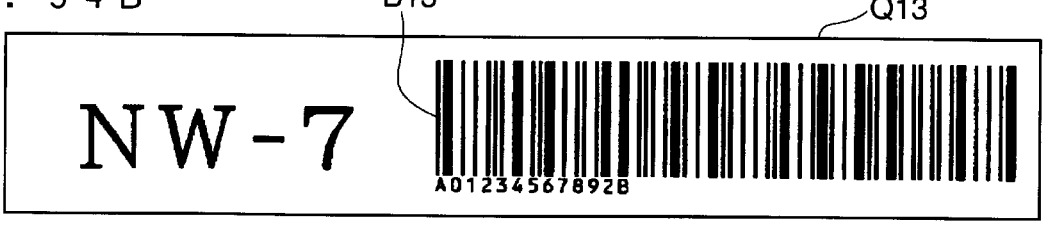
Figure 34C:
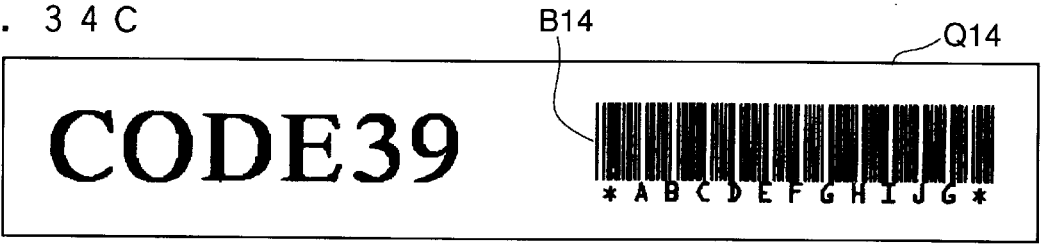
Figure 34D:
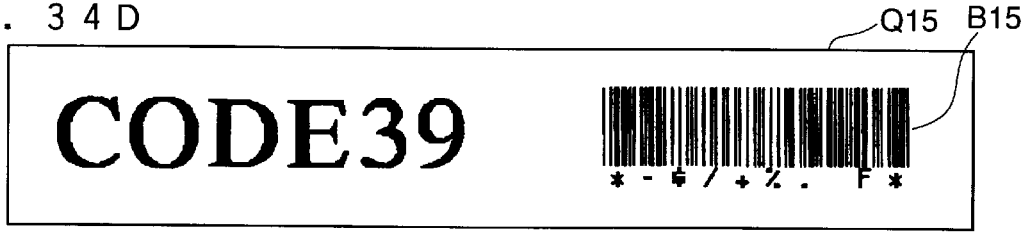
Figure 34E:
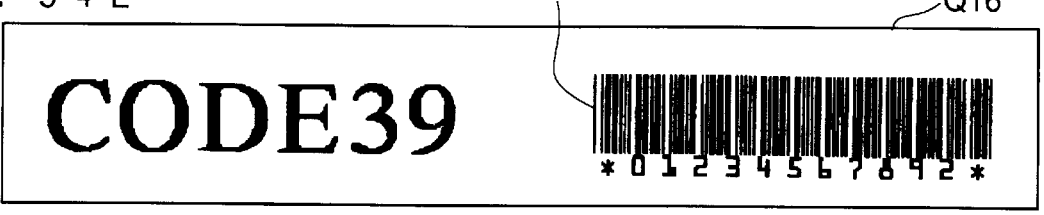

When the option "ARBITRARY" is selected for setting a printing position, a bar code mark (hereinafter, provisionally represented by a symbol "✖") to be displayed is handled on the display screen 41 similarly to the ad mark M10, the human mark M11, the telephone mark M21 and the like, described above with reference to FIGS. 40A to 42B. In short, the bar code mark is treated as a letter similarly to these marks. Further, since the bar code mark is treated as one letter, it is possible to lay out letter strings including the same in the same manner as described above with reference to FIGS. 43A to 43E, thereby forming a label. For instance, as shown in FIG. 44A, when the print key is depressed in a state where the letter string "JAN-8" is input in a first paragraph BLK1 while the symbol "✖" representing a bar code mark M0 is entered in a second paragraph BLK2, thereby displaying the letter string and the bar code mark on the display screen 41, the bar code image B1, for instance, is formed at a printing position indicated by the bar code mark M0, that is, in the second paragraph BLK2, and the letter string "JAN-8" and the bar code are printed as shown in FIG. 31A. Thus, it is possible to form the label Q1 having the letter string "JAN-8" and the bar code printed thereon.

The labels Q2 to Q16 described above with reference to FIGS. 31B to 34E can be produced in the same manner.

Further, in reverse order, for instance, as shown in FIG. 44B, when the print key is depressed in a state where the bar code mark M0 ("✻") is input in a first paragraph BLK1, while the letter string "JAN-8" is input in a second paragraph BLK2, the bar code image B1, for instance, is formed at a printing position indicated by the bar code mark M0, that is, in the first paragraph BLK1, and the bar code and the letter string "JAN-8" are printed as shown in FIG. 39A. Thus, it is possible to form the label Q17 having the letter string "JAN-8" and the bar code printed thereon. Further, for instance, as shown in FIG. 44C, in a state where the same bar code mark M0 ("✻") is input and displayed in a first paragraph BLK1, and in which a graphic (tomato mark) M1 indicating a tomato and a letter string "Tomato" following the mark are input and displayed on a first line of a second paragraph BLK2, while a letter string "¥50" is input and displayed on a second line of the second paragraph, when the print key is depressed with the "backward alignment" (method) being specified, a bar code image C9, for instance, is formed at a printing position indicated by the bar code mark M0, that is, in the first paragraph BLK1, and at the same time the second paragraph BLK2 is laid out by the "backward alignment". Then, the first paragraph BLK1 and the second paragraph BLK2 are printed as shown in FIG. 39B, referred to hereinabove, thereby making it possible to produce a label R9 shown in the figure.

Figure 45:
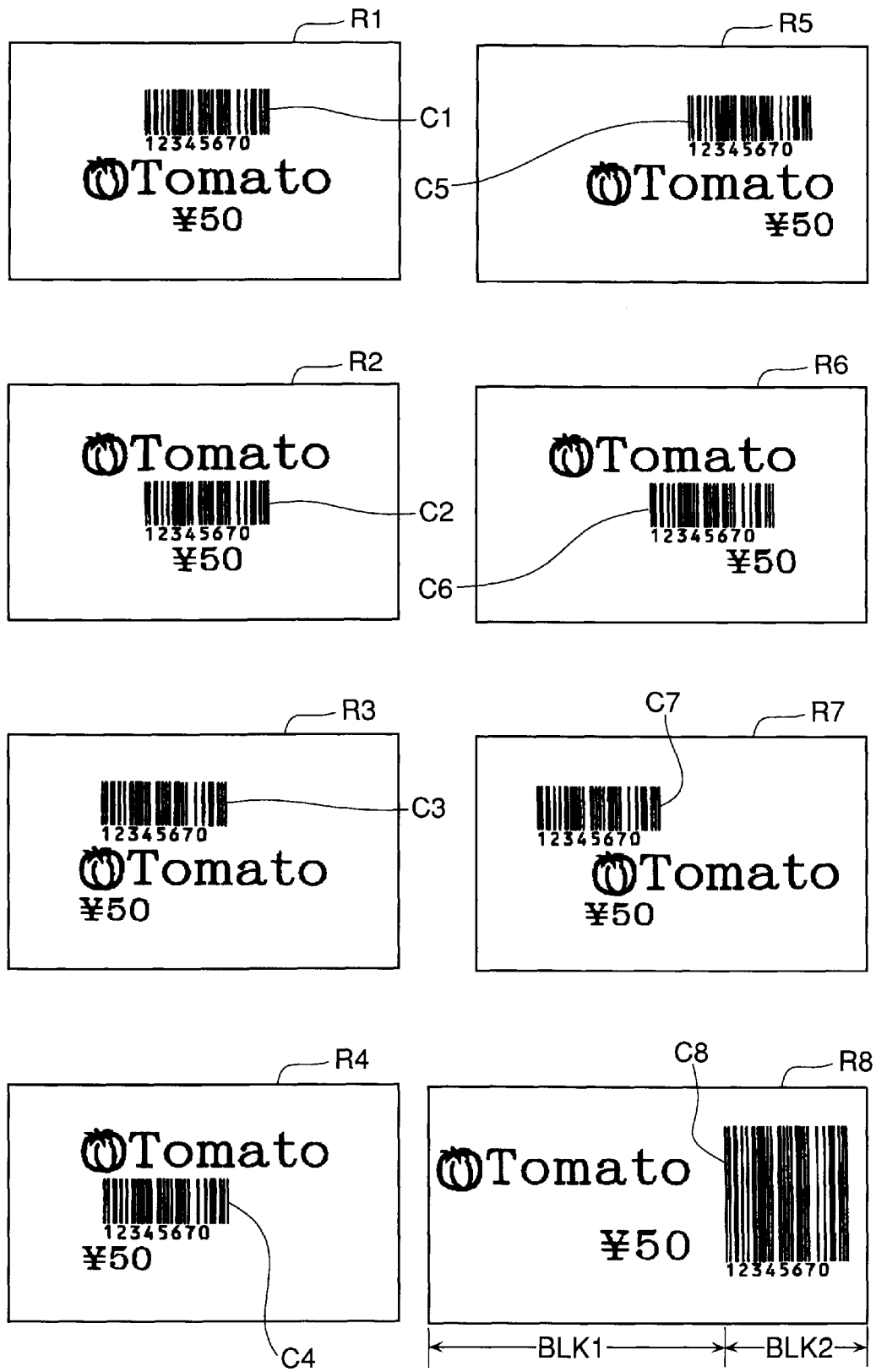
FIG. 45 is a diagram useful in explaining examples of labels which are printed with normal letter string images subjected to the same various types of layout processing as carried out in FIGS. 43A to 43E, formed based on examples shown in FIGS. 44D to 44G.

Similarly, for instance, as shown in FIG. 44D, in a state where the bar code mark M0 ("✻")is input and displayed on a first line of a first paragraph BLK1, and where the graphic (tomato mark) M1 indicating a tomato and the letter string "Tomato" following the mark are entered and displayed on a second line thereof, with the letter string "¥50" being input and displayed on a third line thereof, when the print key is depressed with the "center alignment" (method) being specified, a bar code image C1, for instance, is formed at a printing position indicated by the bar code mark M0, that is, on the first line of the first paragraph BLK1, with the first paragraph BLK1 being laid out by the "center alignment" (method), thereby making it possible to produce a label R1 shown in FIG. 45. Further, after the same entry and display operation as described above, e.g. if the "forward alignment" (method) is specified, in response to a print instruction by the user, a bar code image C3, for instance, is formed on the first line of the first paragraph BLK1 indicated by the bar code mark M0, with the first paragraph BLK1 being laid out by the "forward alignment" (method), thereby making it possible to form a FIG. 45 label R3. Furthermore, after the same entry and display operation, e.g. if the "backward alignment" (method) is specified, in response to a print instruction by the user, a bar code image C5, for instance, is formed on the first line of the first paragraph BLK1, with the first paragraph BLK1 being laid out by the "backward alignment", thereby enabling a FIG. 45 label R5 to be formed.

Similarly, for instance, as shown in FIG. 44E, in a state where the tomato mark M1 and the letter string "Tomato" following the mark are displayed on the first line of the first paragraph BLK1, and where the bar code mark M0 ("✻") is displayed on the second line thereof, with the letter string "¥50" being displayed on the third line thereof, e.g. if the "center alignment" (method) is specified, in response to a print instruction by the user, a bar code image C2 is formed on the second line of the first paragraph BLK1, with the first paragraph BLK1 being laid out by the "center alignment", thereby making it possible to form a FIG. 45 label R2. Further, in a state where the same entry and display operation as described above is carried out, e.g. if the "forward alignment" (method) is specified, a bar code image C4 is formed on the second line of the first paragraph BLK1, indicated by the bar code mark M0, with the first paragraph BLK1 being laid out by the "forward alignment", thereby making it possible to form a FIG. 45 label R4. Further, in the state of the same entry and display operation being carried out, e.g. if the "backward alignment" (method) is specified, in response to a print instruction by the user, a bar code image C6 is formed on the second line of the first paragraph BLK1, with the first paragraph BLK1 being laid out by the "backward alignment", thereby making it possible to produce a FIG. 45 label R6.

Further, for instance, as shown in FIG. 44F, when the user instructs printing after inserting spaces into front parts of the second and third lines from the FIG. 44D state, e.g. even if the "forward alignment" (method) has been specified, a bar code image C7 is formed in a manner such that the second and third lines are moved backward (rightward) by the respective spaces, thereby enabling a FIG. 45 label R7 to be produced. Similarly, for instance, as shown in FIG. 44G, in a state where the tomato mark M1 and the letter string "Tomato" following the mark are displayed on the first line of the first paragraph BLK1, with the letter string "¥50" being displayed on the second line thereof, and where the bar code mark M0 ("✻") is displayed in the second paragraph BLK2, e.g. if the "backward alignment" (method) is specified, a bar code image C8 is formed in the second paragraph BLK2 indicated by the bar code mark M0 in response to a print instruction, thereby making it possible to form a FIG. 45 label R8.

Figure 46A:
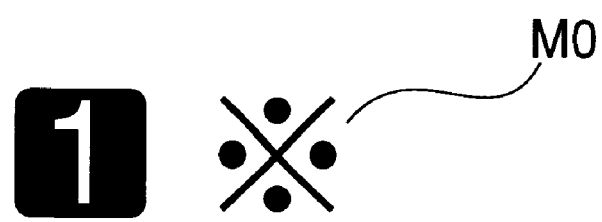
FIGS. 46A to 46B are diagrams useful in explaining other examples of bar code marks.
Figure 46B:
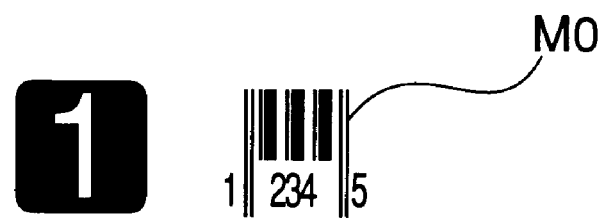

When a printing position is specified after selecting the option "ARBITRARY", the bar code mark M0 ("✻") is handled as one letter similarly to ordinary symbols (the ad mark M10, the human mark M11, the telephone mark M21, mentioned above, etc.). Therefore, it becomes possible to modify the size of the bar code mark by changing letters in size (mainly in the direction of height of the letters), as well as finely change a printing position by inserting a space forward or rearward of the bar code mark M0. That is, if a printing position is specified by selecting the option "ARBITRARY", it is possible to specify a printing position with a high degree of freedom. Although in the above examples, the symbol "✻" is used for the bar code mark M0 by (see FIG. 46A) for convenience of description (for purposes of ease of insertion into the description), it is preferable, similarly to the case of the ad mark M10, the human mark M11 and the telephone mark M21, to use a graphic (see FIG. 46B, for instance) more suitably matching the image of the bar code, which makes it easy to grasp a printed image.

Referring to FIG. 6, after completing preparation of a bar code image as described above (No to steps S20 to S30, S40), when the bar code print key is depressed, a keyboard interrupt (bar code print key interrupt in this example) is generated (Yet to S40 in FIG. 6, see S26 in FIG. 7), for instance, similarly to the case of the print key being depressed, and the print image-forming process (S50) is started. Although in the present embodiment, the bar code print key is exclusively provided for printing bar code images, this is not limitative, but it is also possible to instruct a printing operation for printing a bar code as one of various types of printing operations by another instruction method e.g. of simultaneously depressing a letter (number or the like) key for use in instructing a bar code-printing operation as a type of printing operation and the print key.

Figure 10:
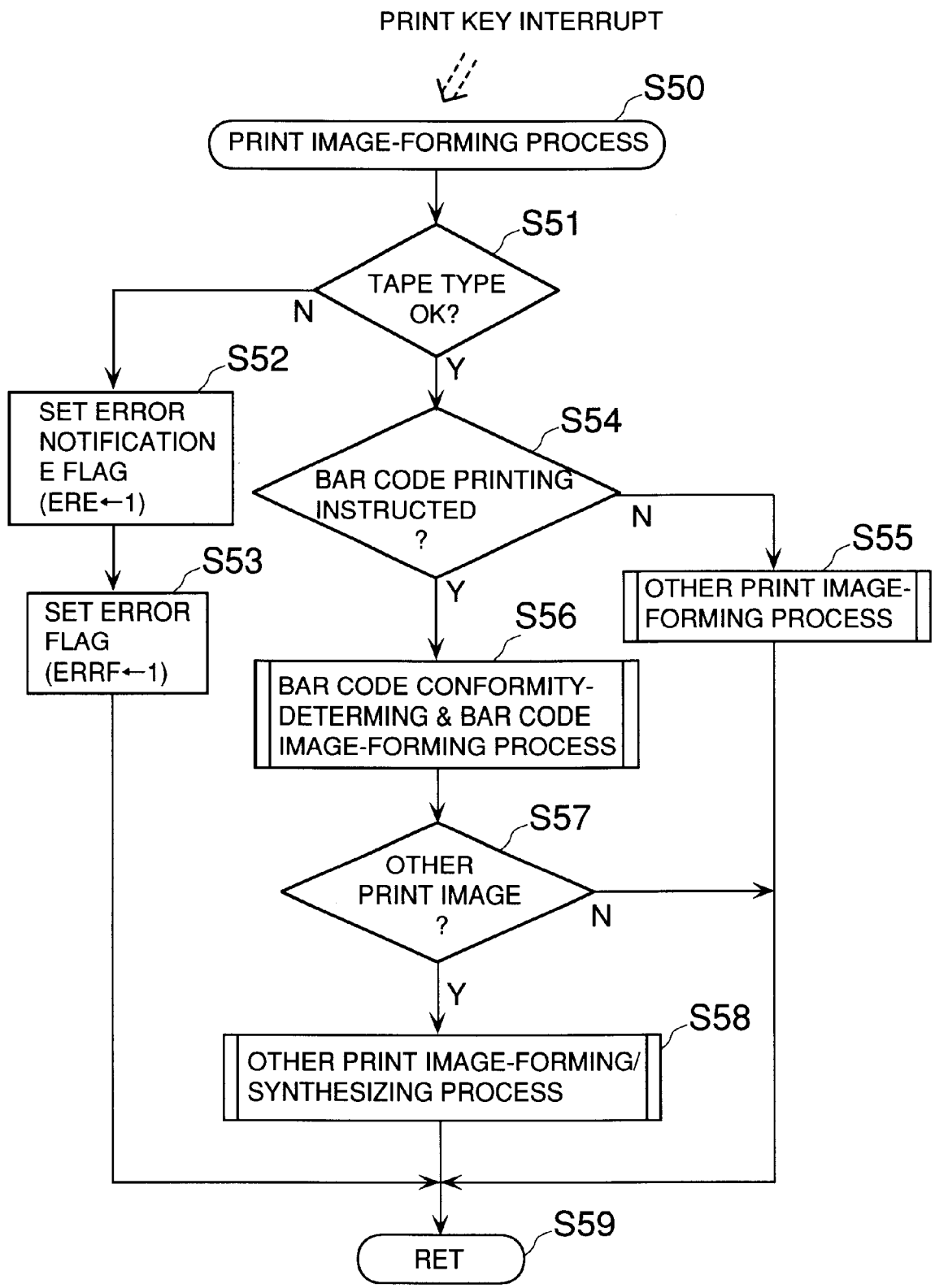
FIG. 10 is a flowchart showing an example of a print image-forming process in FIG. 6.

After starting the print image-forming process (S50), as shown in FIG. 10, first, it is determined at step S51 whether or not the type of tape T is set. For instance, if it is determined that the type of tape T set is abnormal (No to S51), which will occur e.g. when the type of tape T set by the tape type entry (S25 in FIG. 7) and the type of tape T detected by the tape-discriminating sensor 141 do not agree with each other, a detailed error notification E flag for notifying the user of the fact is set (ERE←1) at step S52, and the error representative flag ERRF is set (ERRF←1) at step S53, followed by terminating the print image-forming process (S50) at step S59. Alternatively, if it is determined that the type of tape T set is normal (Yes to S51), next, it is determined at step S54 whether or not the bar code-printing operation is instructed, that is, whether or not the bar code-printing operation is instructed as one of various types of printing operations. If the bar code-printing operation is not instructed (No to S54), a print image, such as the above-mentioned letter string image of the letter string "ABCDEF" or the like, is formed at step S55, followed by terminating the print image-forming process (S50) at the step S59. Since the process for forming another type of a print image (S55) is carried out in the same manner as in the prior art, detailed description thereof is omitted.

On the other hand, if it is determined that the bar code-printing operation is instructed (Yes to S54), it is determinedwhetherornotabarcode set for printing conforms to the bar code print quality standard (bar code conformity), and if the bar code conforms to the standard, a bar code image thereof (actually, bar code image data representative of the bar code image) is formed (bar code conformity-determining & bar code image-forming process: step S56). Then, it is determined at step S57 whether or not there are any other images to be printed other than the bar code image. As described above, if the bar code-printing operation is instructed after preparation of an image (letter string image, for instance) other than the bar code image (Yes to S57), (image data representative of) the image is produced and synthesized with the bar code image at step S58, followed by terminating the print image-forming process (S50) at the step S59. If there is no image to be formed other than the bar code image (No to S57), the print image-forming process (S50) is immediately terminated (S59).

As described hereinbefore with reference to FIG. 6, after termination of the print image-forming process (S50), it is determined (S60) whether or not there has occurred an error. If it is determined that there has occurred an error (Yes to S60), the detailed error flag is checked to notify the user of the fact (S80), followed by returning again to the wait state for waiting for the entry/selection/setting/instruction operation (S20) or the tape type-setting operation (S30) (No to S40), whereas if it is detected that no error has occurred (No to S60), next, the print image formed is printed (S70). When the fixed length or the like is set, cutting operations for cutting the leading edge and the trailing edge of the print image are carried out to thereby form a desired label (S70), followed by terminating the image-forming/printing process (S10) at the step S90.

Although in the tape printing apparatus 1, as described above, color printing of a print image is carried out by the ink jet printing method, in this case, color printing is effected by using C (cyan) ink, M (magenta) ink, Y (yellow) ink, and K (black) ink as basic colors, so that print image data representative of a print image is formed based on the four basic colors C, M, Y, and K, and the print image is printed by decomposing the print image into the basic colors, based on image data items arranged in the basic color-by-basic color arranging buffer and corresponding to the respective basic colors, by using corresponding inks. Therefore, when a bar code image is formed as a print image in the above print image-forming process (S50), the bar code image is also printed by decomposing the same into the basic colors.

More specifically, in the tape printing apparatus 1, a bar code image is printed by the ink jet printing method by decomposing the bar code image into a plurality of (four in this case) basic colors, and the plurality of basic colors include three primary colors. As the three primary colors, a combination of C (cyan), M (magenta), and Y (yellow) (hereinafter referred to as "C M Y") is used. In this case, by a so-called subtractive color mixing process, various tones of colors can be expressed, and hence bar code images can be printed in various tones. Therefore, it is possible to print color bar code images suitable for expressing colors by reflected light, similarly to those formed by various XY plotters, printers and the like of the general type. Furthermore, the basic colors further include a basic color corresponding to a mixed color of the three primary colors C, M, Y. That is, when color images are printed by using the plurality of basic colors, e.g. a mixed color of C, M and Y, K (black) is formed. In general, provision of ink of K (black) makes it possible to obtain a beautiful tone of black color than the use of the K (black) formed by mixing the primary colors. Therefore,since the plurality of basic colors include the color K, bar code images (print images) can be printed as beautiful color images printed by using the four basic colors.

As described hereinabove, in the tape printing apparatus 1, when the above-mentioned letter string image of the letter string "ABCDEF" for the like is printed as a print image, it is possible to specify printing colors of letters and a background thereof by depressing the color-specification key and the color-setting key. Therefore, when the ground color of the tape T as a printing object is white, a printing color of the background (background color) can cause the tape T to appear to have a ground color provided by the printing color. In this case, after the ground color of the tape T has been provided by the background color, if a bar code image is printed which has the same color as the ground color of the tape T (background color of the image) set to a bar code line color (first bar color) or a bar code background color (second bar color), bars set to the same color are absorbed in the background. That is, if a background of a bar code image is printed by setting one of the bar code line color (first bar color) and the bar code background color (second bar color) to the ground color of the tape T (background color of the image), bars printed in the one of the colors are absorbed in the background of the bar code image, so that it is possible to obtain a bar code image whose bars having the other of the two colors are printed on the background of the bar code image.

As described above, in the tape printing apparatus 1, the tape T as a printing object can be printed with a bar code image and then the printed portion of the tape T can be attached to a desired object as a label. More specifically, in the above case, by setting the background color of a label to a more noticeable one than the color of an article, the printed portion can be made conspicuous when the label is attached to the article, or inversely, by setting the background color less noticeable than the color of the article, the printed portion can be made inconspicuous when the label is attached to the article. This makes it possible to obtain a bar code image having a more desirable tone of color. Although in the above description, a case is described in which the tape T is caused to appear to have a ground color provided by the background color of the bar code image, this is not limitative, but even when the tape T is not caused to appear to have the ground color provided by the background color of the bar code image, if the same color as the original ground color of the tape T is set to the bar code line color (first bar color) or the bar code background color (second bar color), the same result can be obtained. Further, if the option "WHOLE" is to set a printing position on the label, and the bar code image is printed on the whole of the label (without leaving any blank at peripheral portions of the label), the same effects can be obtained.

Figure 11:
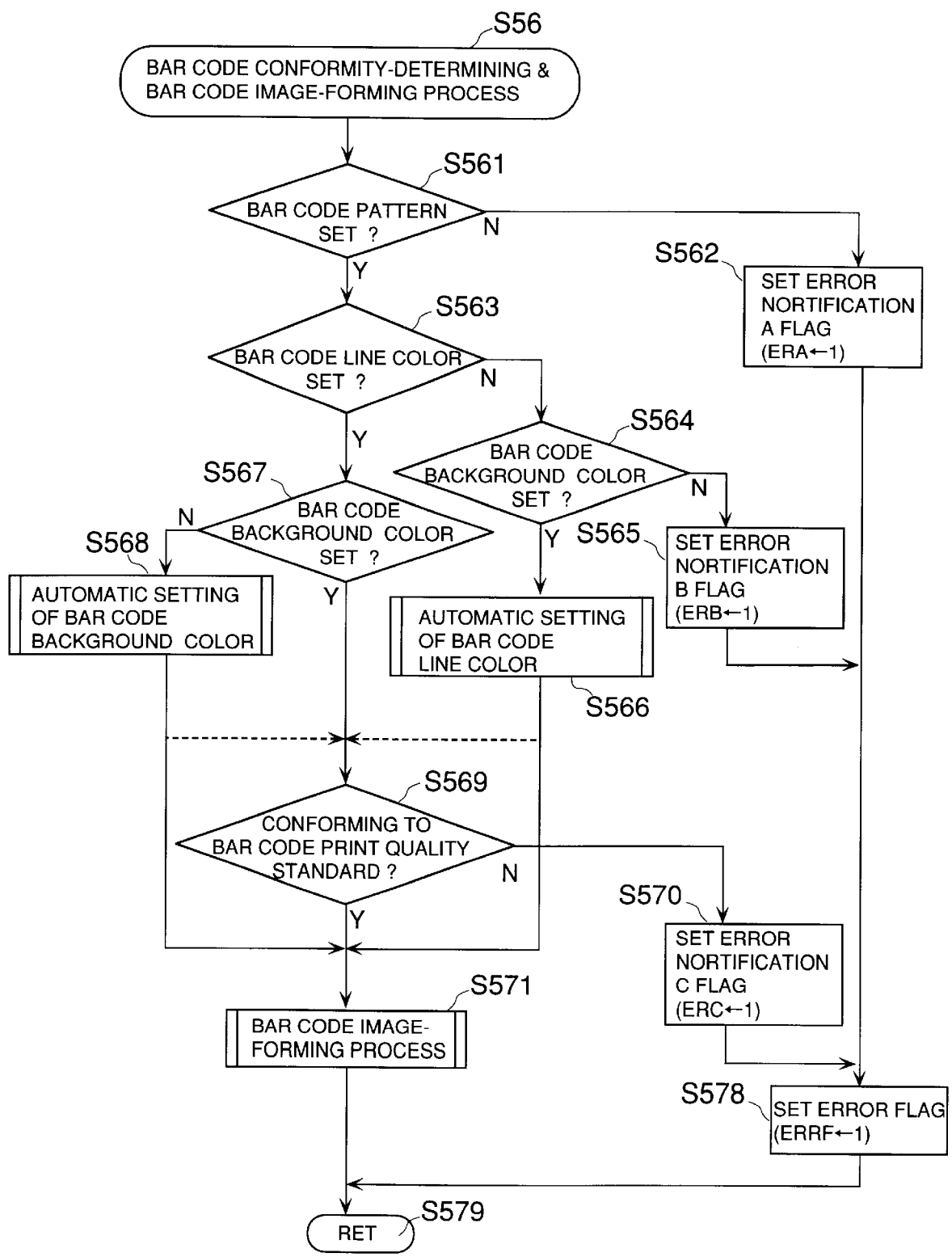
FIG. 11 is a flowchart showing an example of a bar code conformity-determining & bar code image-forming process in FIG. 10.

Next, the above-mentioned bar code conformity-determining & bar code image-forming process (S56) will be described in detail. Referring to FIG. 11, when the process (S56) is started, it is determined at step S561 whether or not a bar code pattern has been set, that is, whether or not the FIG. 7 bar code pattern-setting operation (S24: detailed description is made with reference to FIG. 9) has been completed in the FIG. 6 entry/selection/setting/instruction operation. If the bar code pattern-setting operation has not been completed (No to S561), the detailed error notification A flag for notifying the user of the fact is set (ERA←1) at step S562, and the error representative flag ERRF is set (ERRF←1) at step S578, followed by terminating the bar code conformity-determining & bar code image-forming process (S56) at step S579. If the bar code pattern-setting operation (S24 in FIG. 7) has been completed (Yes to S561), next, it is determined at step S563 whether or not the bar code line color-setting operation (S22) described hereinbefore with reference to FIG. 7 has been completed, that is, whether or not a line color of the bar code is set. If the bar code line color is not set (No to S563), next, it is determined at step S564 whether or not the bar code background color-setting operation (S23) described above with reference to FIG. 7 has been completed, that is, whether or not a background color of the bar code is set.

Now, if no background color of the bar code is set (No to S564), the result is that neither the line color of the bar code nor the background color thereof is set, and hence it becomes impossible to carry out a bar code image-forming process (S571 in FIG. 11) for forming a bar code image or the print image-printing process (S70 in FIG. 6) for printing the bar code image. Therefore, the detailed error notification B flag for notifying the user of the fact is set (ERB←1) at step S565, and the error representative flag ERRF is set (ERRF←1) at step S578, followed by terminating the bar code conformity-determining & bar code image-forming process (S56) at the step S579. Although in this embodiment, an error message is displayed to notify the user of occurrence of an error when neither the line color nor the background color is set, this not limitative, but it is also possible to form and print a bar code image by setting the line color and the background color to default colors (for instance, the line color is set to black and the background color to white), without handling the above situation as an error situation.

As described hereinabove, conventionally, a bar (including margins at opposite ends of a bar code, in this example) having a higher reflectance is referred to as a white bar or a space, and white-like colors, red-like colors or light colors, such as white, yellow, red, pink, orange and the like, are used for the bar. On the other hand, a bar having a lower reflectance is referred to as a black bar or simply as a bar, and dark colors, such as black, green, blue, dark blue, dark brown, or colors to be complementary colors of laser (red) are used for the bar.

Although in the tape printing apparatus 1, a bar code line color (first bar color) and a bar code background color (second bar color) can be set, this is not limitative, but the line color (first bar color) may be literally set to the color of the black bar and the background color (second bar color) to the color of the white bar, or inversely, the line color (first bar color) may be set to the color of the white bar and the background color (second bar color) to the color of the black bar. Of course, it is also possible to fixedly set the colors as e.g. in the former case (line color (first bar color)=color of the black bar (white bar) and background color (second bar color)=color of the white bar (black bar)), or as in the latter case (inverse to the former case), but in the tape printing apparatus 1, the "bar code line color" and the "bar code background color" are distinguished from each other for convenience of description and for purposes of convenience of settings (operation). Hence, of colors set to the line color and the background color, a bar having a color with a higher reflectance is defined as a white bar, while a bar having a color with a lower reflectance is defined as a black bar, whereby the bar code image-forming process (S571 in FIG. 11) is carried out.

In the following, for simplicity and for purposes of ease of understanding, description will be made assuming that for instance, a color a, a color b, a color c and a ground color can be selected as examples of colors printable in the tape printing apparatus 1, that is, as examples of colors printable as bar colors, irrespective of whether the colors are generally (conventionally) used as colors for white bars or colors for black bars. Therefore, on the selection screen, described hereinabove, for setting a bar code line color, options for selecting the color a, the color b, the color c and the ground color as candidate colors for a line color (first bar color) are displayed. Now, the term "ground colors" is used to mean the ground color of the tape T as the printing object (color of a printing surface of a sheet of paper before printing). More specifically, let it be assumed that on the line color-setting selection screen, the options for selecting the color a, the color b, the color c and the ground color as candidate colors for a line color (first bar color) are displayed to permit the user to highlight a desired one of the options by operating the cursor keys and select the desired one by depressing the selection key. Similarly, it is assumed that for instance, on the above-mentioned background color-setting selection screen, the options for selecting the color a, the color b, the color c and the ground color as candidate colors for a background color (second bar color) are displayed to permit the user to highlight a desired one of the options by operating the cursor keys and select the desired option by depressing the selection key.

Further, as described above, in the tape printing apparatus 1, there are provided tapes T which are different in material or have ground colors other than white. Generally, when printing is carried out by the ink jet printing method, letters can be printed on any material in the form of a sheet, such as a paper material, PET (polyethylene terephthalate), a metal material, glass or the like, so long as ink and surface treatment of a printing object are suitable to each other. Further, paper, vinyl, polyester films, polyamide films, clothes, aluminum films are available on the market. Therefore, in the following, let it be assumed that similarly to the case of the bar colors, for simplicity of the description and for purposes of ease of understanding, any of materials A, B and C can be selected as an example of the material of a tape T (i.e. sheet or paper as a printing object). In short, description will be made assuming that a tape T formed of any of the materials A, B and C can be mounted in the apparatus.

Further, as described above, in the tape printing apparatus 1, it is possible to select a desired one from the bar code types. As conditions of the optical reflectance of the white bar and the black bar, generally, as shown in FIG. 12, a value of a PCS (Print Contrast Signal) (PCS value), a value of an optical reflectance ratio, and a value of MRD (Minimum Reflectance Difference) (MRD value) are standardized by ANSI (American National Standards Institute), JIS and the like (hereinafter, these values are referred to as "bar code print quality standards"), as values which permit bar codes to be read or recognized. In the following, description will be made mainly by taking the bar code print quality standard based on a PCS value of Item No.1 appearing in FIG. 12 as an example.

In this case, in the tape printing apparatus 1, for instance, as shown in FIGS. 13 to 15, the bar code print quality standard value table formed according to the types (especially, materials) of tape T is stored in the ROM 220 as a predetermined bar code print quality standard defining conditions of the optical reflectance of the two kinds of bars (i.e. white and black bars). A Mark "X" in a column of "CONFORMITY/NONCONFORMITY" at a right-side end of the table in each figure designates that a combination of the color of the white bar and that of the black bar does not conform to the bar code print quality standard (condition of the PCS value: PCS≧0.75, in this example), while a mark "○" designates that the combination of the colors of the white and black bars conforms to the bar code print quality standard. The mark "○○" designates that the combination of the colors of the white and black bars more suitably conforms to the bar code print quality standard than the combination indicated by the mark "○". Further, for instance, as shown in FIG. 16, the automatic bar color-setting table and the like are defined in advance and stored in the ROM 220, to allow a combination of colors of the white and black bars conforming to the bar code print quality standard to be automatically set. Further, in order to determine whether or not a combination of colors of the bars conforms to the bar code print quality standard, for instance, as shown in FIG. 17, the bar color conformity determination table is defined in advance and stored in the ROM 220.

Although in the FIG. 17 example, only a case is shown in which the material of tape T is A, it goes without saying that the bar color conformity determination table also contains values defined for the materials B and C. Further, in this example, for instance, a case where the optical reflectance of the first bar color is higher than that of the second bar color, as shown in FIG. 17, Nos. 3-2 to 3-4, 3-7, and 3-14 to 3-15, and a case where the optical reflectance of the first bar color is lower than that of the second bar color, as shown in Nos. 3-5, 3-8 to 3-10, and 3-13, are mixed. This is because the bar code line color (first bar color) and the bar code background color (second bar color) are equally treated in the tape printing apparatus 1, as described above. In a case where the bar colors are fixedly handled as the bar code line color (first bar color)=black bar color and the bar code background color (second bar color)=white bar color, there remain only items of Nos. 3-5, 3-8 to 3-10, 3-12, and 3-13, whereas in a case where the bar colors are fixedly handled in a reverse manner, there remain only items of Nos. 3-2 to 3-4, 3-7, 3-14 to 3-15. A total of these cases and an additional case in which the bar code line color (first bar color)=the bar code background color (second bar color) provides same contents shown in FIG. 13, so that the bar color conformity determination table may be substituted by the bar code print quality standard value table shown in FIGS. 13 to 15.

A column of "CORRESPONDING No." at a right-side end of each of the FIG. 16 automatic bar color-setting table and the FIG. 17 bar color conformity determination table indicates corresponding No. of the bar code print quality standard value table shown in FIGS. 13 to 15. That is, since the FIG. 16 automatic bar color-setting table and the FIG. 17 bar color conformity determination table are both formed based on the bar code print quality standard value table in FIGS. 13 to 15, it is possible to store only the bar code print quality standard value table and substitute the same for the automatic bar color-setting table and the bar color conformity determination table as required. In the following description, however, for purposes of ease of understanding, it is assumed that these tables (the bar code print quality standard value table, the automatic bar color-setting table, the bar color conformity determination table) are separately stored in the ROM 220.

In the above case, the tables (the bar code print quality standard value table, the automatic bar color-setting table, the bar color conformity determination table) are defined according to the types of tape (printing object) T (see FIGS. 13 to 17). More specifically, in the tape printing apparatus 1, values stipulated based on the bar code print quality standard and conformity/nonconformity determined based on the stipulated values are defined according to the types (especially, material) of tape (printing object) T, each of which is detected or set (S30 in FIG. 6 described above, see FIG. 8). Hence, the user can easily print a bar code image having desired tones of colors conforming to a bar code print quality standard by carrying out a process described hereinafter, without being conscious of the types of tape T or without any knowledge of the bar code print quality standard of a bar code (or without paying any attention to the bar code print quality standard).

For instance, as shown in FIG. 11, when a bar code background color of the bar code is set (Yes to S564), the background color is handled as a bar color already set or determined, and a line color of the bar code is automatically set at step S566. That is, the automatic bar color-setting table which conforms to the bar code print quality standard defined by the above bar code print quality standard value table is referred to, whereby a line color of the bar code is automatically set (S566) (for instance, the FIG. 16 automatic bar color-setting table is referred to, whereby when the material of the tape T is A and the bar (background) color already set is "COLOR a", the other bar (line) color is set to "COLOR c": see No.2-1). Similarly, when a bar code line color is set (Yes to S563), it is determined at step S567 whether or not a background color is set. Now, when the background color is not set (No to S567), the bar code line color is treated as a bar color already set, and a bar code background color is automatically set (S568) (for instance, the FIG. 16 automatic bar color-setting table is referred to, whereby when the material of the tape T is A and the bar (line) color already set is "COLOR a", the other bar (background) color is set to "COLOR c").

As described above (in one of the above cases), in the tape printing apparatus 1, a bar code pattern is set which defines the arrangement of two kinds of bars, that is, one or more first bars and one or more second bars different in reflectance from the first bars (S20 in FIG. 6, S24 in FIG. 7), and a bar code line color (first bar color defining a printing color of the first bars) (S20 in FIG. 6, S22 in FIG. 7) or a bar code background color (second bar color defining a printing color of the second bars) (S20 in FIG. 6, S23 in FIG. 7) is set. Then, a bar code background color (second bar color) is set (S568 in FIG. 11) based on the predetermined bar code print quality standard (e.g. condition of No. 1 PCS value in FIG. 12: PCS≧0.75) defining the condition of the optical reflectance of the two kinds of bars such that a combination of the bar code background color and the bar code line color (first bar color) conforms to the bar code print quality standard. Or alternatively, a bar code line color (first bar color) is set (S566 in FIG. 11) such that a combination of the bar code line color and the bar code background color (second bar color) conforms to the bar code print quality standard.

After the bar code line color and the bar code background color are automatically set (S566 or S568), a bar code image as a print image of the bar code is formed (S571) based on the bar code pattern set or determined, the bar code line color (first bar color) and the bar code background color (second bar color), followed by terminating the bar code conformity-determining & bar code image-forming process (S56). More specifically, in producing the bar code image, first, out of a first bar having the bar code line color (first bar color) and a second bar having the bar code background color (second bar color), a bar having a higher reflectance is set to a white bar, and a bar having a lower reflectance is set to a black bar. Then, white bars and black bars thus determined are arranged to form the bar code image (by decomposing the bar code image into the four basic colors, as described hereinbefore).

After completion of the bar code conformity-determining & bar code image-forming process (S56), if there is another print image to be formed (Yes to S57), as described above with reference to FIG. 10, this print image is produced and synthesized with the bar code image (S58), followed by terminating the print image-forming process (S50) at the step S59, whereas when there is no image other than the bar code image (No to S57), the print image-forming process (S50) is immediately terminated (S59). After termination of the print image-forming process (S50), as described hereinbefore with reference to FIG. 6, it is determined (S60) whether or not an error has occurred (error representative flag ERRF=1). If it is detected that there has occurred an error (Yes to S60), a detailed error flag (an error notification A flag or the like) is checked to notify the user of the fact (contents of the error, etc.) (i.e. display an error message notifying the user of the fact, on the display screen 41) at step S80, followed by returning again to the wait state for waiting for the entry/selection/setting/instruction operation (S20) or the tape type-setting process (S30) (No to S40). On the other hand, if it is detected that no error has occurred (error representative flag ERRF=0) (No to S60), next, the print image formed is printed at step S70. When the fixed length or the like is set, cutting operations for cutting the leading edge and the trailing edge of the print image are carried out to thereby form a desired label at the step S70, followed by terminating the image-forming/printing process (S10) at the step S90.

In other words, in the above case, in the tape printing apparatus 1, when one of the bar code line color (first bar color) and the bar code background color (second bar color) is set, the other color is set such that a combination of the other color and the one color conforms to the bar code print quality standard, and a bar code image formed based on the combination is printed. Hence, the user can easily print a bar code image having tones of colors conforming to the bar code print quality standard of the bar code simply by setting one of the bar code line color (first bar color) and the bar code background color (second bar color) and the bar code pattern, even if he has no idea of the bar code print quality standard (or even if he does not pay any attention to the bar code print quality standard).

Further, when one of the bar code line color (first bar color) and the bar code background color (second bar color) is set, if it is considered that there can be no color corresponding to the other color which will be combined with the one color such that a combination of the other color and the one color conforms to the bar code print quality standard, a subroutine shown by a dotted line in FIG. 11 may be carried out. In this case, after a temporary color (e.g. the same color as the one color) is set as the other color, similarly to a process described hereinafter, it is determined at step S569 whether or not a combination of the one color and the temporary color conforms to the bar code print quality standard (for instance, condition of PCS value in FIG. 12: $PCS \geq 0.75$). Since the combination does not conform to the bar code print quality standard (No to S569), an error message is displayed to notify the user of the fact.

As shown in FIG. 11, when a bar code line color is set (Yes to S563) and at the same time a bar code background color is also set (Yes to S567), next, it is determined at step S569 whether or not a standard value (PCS value, for instance) set according to a combination thereof conforms to the bar code print quality standard (e.g. $PCS \geq 0.75$). More specifically, a bar color conformity determination table which conforms to the bar code print quality standard defined by the above bar code print quality standard value table is referred to, whereby it is determined at step S569 whether or not the standard value set according to the combination conforms to the bar code print quality standard (e.g. $PCS \geq 0.75$) (for instance, the FIG. 17 bar color conformity determination table is referred to, whereby e.g. when the tape T is formed of the material A, the first bar (line) color is "COLOR c" and the second bar (background) color is the "ground color", it is determined that the standard value conforms to the bar code print quality standard (No.3-12), whereas when the first bar (line) color is "COLOR a" and the second bar (background) color is "COLOR b", it is determined that the standard value does not conform to the bar code print quality standard (No.3-2)).

When the standard value does not conform to the bar code print quality standard (No to S569), a detailed error notification C flag for notifying the user of the fact is set (ERC←1) at step S570, and the error representative flag ERRF is set (ERRF←1) at step S578, followed by terminating the bar code conformity-determining & bar code image-forming process (S56) at the step S579. On the other hand, when the standard value conforms to the bar code print quality standard (reflectance difference<standard value) (Yes to S569), as described above, a bar code image is formed (S571), followed by terminating the process (S56) at the step S579. It should be noted that processes to be carried out after termination (S579) of the bar code conformity-determining & bar code image-forming process (S56), that is, the steps S57 to S59 in the FIG. 10 print image-forming process up to the steps S60 to S90 in the FIG. 6 image-forming/printing process are the same as described hereinbefore, and detailed description thereof will be omitted.

In the above case, in the tape printing apparatus 1, a bar code pattern is set which defines the arrangement of two kinds of bars, that is, one or more first bars and one or more second bars different in reflectance from the first bars (S20 in FIG. 6, S24 in FIG. 7). Further, a bar code line color (first bar color to be a printing color of the first bars) is set (S20 in FIG. 6, S22 in FIG. 7), and a bar code background color (second bar color to be a printing color of the second bars) is set (S20 in FIG. 6, S23 in FIG. 7). Then, it is determined (S569 in FIG. 11) whether or not a combination of the bar code line color (first bar color) and the bar code background color (second bar color) conforms to the predetermined bar code print quality standard (e.g. condition of No. 1 PCS value in FIG. 12) defining the conditions of the optical reflectance of the two kinds of bars. When it is determined that the combination of the colors conforms to the bar code print quality standard (Yes to S569 in FIG. 11), a bar code image is created (S571 to S579 in FIG. 1, S57 to S59 in FIG. 10, S59 in FIG. 6) based on the set or determined bar code pattern, the bar code line color (first bar color) and the bar code background color (second bar color), as a print image of the bar code having an array of first bars having the bar code line color (first bar color) and second bars having the bar code background color (second bar color). If it is detected that no error has occurred (No to S60 in FIG. 6), the print image (bar code image) is printed to carry out cutting operations, thereby forming a desired label (S70), followed by terminating the image-forming/printing process (S10) at the step S90.

That is, in the above case, it is possible to set colors of two kinds of bars, and when a combination of the colors conforms to the bar code print quality standard, an image of the bar code is printed, so that the user can easily print a bar code image printed in a desired color and conforming to the bar code print quality standard of the bar code, simply by setting the bar code pattern and colors of the two kinds of bars, even if he has no idea of the bar code print quality standard (or even if he does not pay any attention to the bar code print quality standard). Although in the above case, when a combination of colors of the two kinds of bars does not conform to the bar code print quality standard (S570, S578, S579 in FIG. 11, S57 to S59 in FIG. 10, S60 in FIG. 6), the user is notified of the fact (S80 in FIG. 6), this is not limitative, but methods considered to be suitable may be employed as desired. For instance, one of colors of the two kinds of bars may be automatically adjusted for printing. Alternatively, the user may be prompted for setting colors again, the above processes may be simply terminated without effecting a printing operation, or these processes may be carried out in combination. In any of the cases, it is possible to save the trouble of printing a bar code image which does not conform to the bar code print quality standard and prevent the waste of tape (printing object) caused thereby.

Further, according to the above embodiment, when the combination of the colors does not conform to the bar code print quality standard (the same as the above), the user is notified of the fact (S80 in FIG. 6), so that the user can grasp occurrence of inconformity with ease, thereby quickly coping with the problem, e.g. by changing the settings of bar colors. That is, conventionally, the user can not recognize unreadable combination of colors, before it is checked by optical means, such as a bar code reader or the like, whether or not the combination of the colors is readable, and hence it is required to carry out a correct color-setting operation again, after effecting error checking. In the tape printing apparatus 1, however, at a time the colors of two kinds of bars are set, it is determined whether or not a combination of the colors conforms to the bar code print quality standard, and if the combination does not conform, the user is notified of the fact, thereby quickly coping with the inconvenience, e.g. by changing the settings of bar colors.

Further, in the above embodiment, the invention is applied to an ink jet printing apparatus, but it can also be applied to a thermal type, a laser type, a dot impact type, and so forth. Still further, the image-printing method and device according to the invention are capable of printing a print image on a printing object, even if the printing object is not a label, and affixing the printing object to an object article as it is or by cutting off a printed portion of the printing object. Hence, the invention can be applied to an image-printing device for a printing apparatus of the general type or an apparatus other than the printing apparatus, so long as the image-printing device prints print images on a printing object.

It is further understood by those skilled in the art that the foregoing are preferred embodiments of the invention, and that various changes and modifications may be made without departing from the spirit and scope thereof.

What is claimed is:

1. A method of printing an image, comprising the steps of:

setting a bar code pattern defining the arrangement of bars of two kinds in a bar code, said bars of two kinds including at least one of a first kind and at least one of a second kind, said at least one bar of said first kind being different in optical reflectance from said at least one bar of said second kind;

setting a first bar color which defines a printing color of said at least one bar of said first kind;

setting a second bar color which defines a printing color of said at least one bar of a second kind, based on a predetermined bar code print quality standard which defines conditions concerning said optical reflectance of said bars of two kinds, such that a combination of said first bar color and said second bar color conforms to said predetermined bar code print quality standard, said second bar color being automatically set in response to said first color having been set; and printing a bar code image which is a print image of said bar code, on a printing object, based on said bar code pattern, said first bar color, and said second bar color.

2. A method of printing an image, comprising the steps of:

setting a bar code pattern defining the arrangement of bars of two kinds in a bar code, said bars of two kinds including at least one bar of a first kind and at least one bar of a second kind, said at least one bar of said first kind being different in optical reflectance from said at least one bar of said second kind;

setting a first bar color which defines a printing color of said at least one bar of said first kind;

setting a second bar color which defines a printing color of said at least one bar of said second kind;

determining, based on a predetermined bar code print quality standard which defines conditions concerning said optical reflectance of said bars of two kinds, whether a combination of said first bar color and said second bar color conforms to said predetermined bar code print quality standard; and printing a bar code image which is a print image of said bar code, on a printing object, based on said bar code pattern, said first bar color, and said second bar color, when it is determined that said combination conforms to said predetermined bar code print quality standard.

3. A method according to claim 2, further including the step of notifying that said combination does not conform to said predetermined bar code print quality standard, when it is determined that said combination does not conform to said predetermined bar code print quality standard.

4. A method according to claim 1 or 2, further including the steps of:

defining at least one of a set of reflectance values of possible colors of said bars of two kinds, a set of standard values based on said predetermined bar code print quality standard and corresponding respectively to combinations of said possible colors of said bars of two kinds, information of conformity or nonconformity of each of said combinations, and a set of said combinations conforming to said predetermined bar code print quality standard, in a manner associated with a corresponding one of types of said printing object; and detecting a type of said printing object in use.

5. A method according to claim 1 or 2, further including the steps of:

defining at least one of a set of reflectance values of possible colors of said bars of two kinds, a set of standard values based on said predetermined bar code print quality standard and corresponding respectively to combinations of said possible colors of said bars of two kinds, information of conformity or nonconformity of each of said combinations, and a set of said combinations conforming to said predetermined bar code print quality standard, in a manner associated with a corresponding one of types of said printing object; and setting a type of said printing object in use.

6. A method according to claim 1 or 2, including the step of defining a plurality of types of bar code which are different in a method of arranging said bars of two kinds in said bar code from each other; and wherein the step of setting said bar code pattern includes the step of selecting a desired one of said plurality of types of bar code.

7. A method according to claim 1 or 2, wherein said bar code represents numerical value information such that each bar of said first kind corresponds to one of predetermined two numerical values and each bar of said second kind corresponds to another of said two predetermined numerical values, and wherein the step of setting said bar code pattern includes the step of inputting said numerical value information.

8. A method according to claim 7, wherein said predetermined two numerical values are 0 and 1.

9. A method according to claim 1 or 2, including the steps of setting one of said first bar color and said second bar color to a printing color of a background of said bar code image.

10. A method according to claim 1 or 2, wherein said printing object is a material permitting a portion having said bar code image printed thereon to be affixed to an object as a label.

11. A method according to claim 10, further including the step of setting a printing position of said bar code image on said label.

12. A method according to claim 1 or 2, wherein said bar code image is printed by an ink jet printing method.

13. A method according to claim 1 or 2, wherein said printing object is a tape.

14. A method according to claim 1 or 2, wherein said bar code image is printed by decomposing said bar code image into a plurality of basic colors, and wherein said plurality of basic colors include three primary colors.

15. A method according to claim 14, wherein said plurality of basic colors include a basic color corresponding to a mixed color of said three primary colors.

16. An image printing device comprising:

a bar code pattern-setting section for setting a bar code pattern defining the arrangement of bars of two kinds in a bar code, said bars of two kinds including at least one bar of a first kind and at least one bar of a second kind, said at least one bar of said first kind being different in optical reflectance from said at least one bar of said second kind;

a first bar color-setting section for setting a first bar color which defines a printing color of said at least one bar of said first kind;

a second bar color-setting section for setting a second bar color which defines a printing color of said at least one bar of said second kind, based on a predetermined bar code print quality standard which defines conditions concerning said optical reflectance of said bars of two kinds, such that a combination of said first bar color and said second bar color conforms to said predetermined bar code print quality standard, said second bar color-setting section automatically setting said second bar color in response to said first color having been set; and a bar code image-printing section for printing a bar code image which is a print image of said bar code, on a printing object, based on said bar code pattern, said first bar color, and said second bar color.

17. An image printing device comprising:

a bar code pattern-setting section for setting a bar code pattern defining the arrangement of bars of two kinds in a bar code, said bars of two kinds including at least one bar of a first kind and at least one bar of a second kind, said at least one bar of said first kind being different in optical reflectance from said at least one bar of said second kind;

a first bar color-setting section for setting a first bar color which defines a printing color of said at least one bar of said first kind;

a second bar color-setting section for setting a second bar color which defines a printing color of said at least one bar of said second kind;

a bar color conformity-determining section for determining, based on a predetermined bar code print quality standard which defines conditions concerning said optical reflectance of said bars of two kinds, whether a combination of said first bar color and said second bar color conforms to said predetermined bar code print quality standard; and a bar code image-printing section for printing a bar code image which is a print image of said bar code, on a printing object, based on said bar code pattern, said first bar color, and said second bar color, when it is determined that said combination conforms to said predetermined bar code print quality standard.

18. An image printing device according to claim 17, further including a bar color nonconformity-notifying section for notifying that said combination does not conform to said predetermined bar code print quality standard, when it is determined that said combination does not conform to said predetermined bar code print quality standard.

19. An image printing device according to claim 16 or 17, further including:

a storage device for storing information defining at least one of a set of reflectance values of possible colors of said bars of two kinds, a set of standard values based on said predetermined bar code print quality standard and corresponding respectively to combinations of said possible colors of said bars of two kinds, information of conformity or nonconformity of each of said combinations, and a set of said combinations conforming to said predetermined bar code print quality standard, in a manner associated with a corresponding one of types of said printing object; and a printing object type-detecting section for detecting a type of said printing object in use.

20. An image printing device according to claim 16 or 17, further including:

a storage device for storing information defining at least one of a set of reflectance values of possible colors of said bars of two kinds, a set of standard values based on said predetermined bar code print quality standard and corresponding respectively to combinations of said possible colors of said bars of two kinds, information of conformity or nonconformity of each of said combinations, and a set of said combinations conforming to said predetermined bar code print quality standard, in a manner associated with a corresponding one of types of said printing object; and a printing object type-setting section for setting a type of said printing object in use.

21. An image printing device according to claim 16 or 17, including:

a storage device for storing information defining a plurality of types of bar code which are different in a method of arranging said bars of two kinds in said bar code from each other; and wherein said bar code pattern-setting section includes a bar code type-selecting section for selecting a desired one of said plurality of types of bar code.

22. An image printing device according to claim 16 or 17, wherein said bar code represents numerical value information such that each bar of said first kind corresponds to one of predetermined two numerical values and each bar of said second kind corresponds to another of said predetermined two numerical values, and wherein said bar code pattern-setting section includes a numerical value-inputting section for inputting said numerical value information.

23. An image printing device according to claim 22, wherein said predetermined two numerical values are 0 and 1.

24. An image printing device according to claim 16 or 17, including a background color-setting section for setting one of said first bar color and said second bar color to a printing color of a background of said bar code image.

25. An image printing device according to claim 16 or 17, wherein said printing object is a material permitting a portion having said bar code image printed thereon to be affixed to an object as a label.

26. An image printing device according to claim 25, further including a printing position-setting section for setting a printing position of said bar code image on said label.

27. An image printing device according to claim 16 or 17, wherein said bar code image is printed by an ink jet printing method.

28. An image printing device according to claim 16 or 17, wherein said printing object is a tape.

29. An image printing device according to claim 16 or 17, wherein said bar code image is printed by decomposing said bar code image into a plurality of basic colors, and wherein said plurality of basic colors include three primary colors.

30. An image printing device according to claim 29, wherein said plurality of basic colors include a basic color corresponding to a mixed color of said three primary colors.

* * * * *